United States Patent [19]

Ooi

[11] Patent Number: 4,941,079
[45] Date of Patent: Jul. 10, 1990

[54] PULSE WIDTH MODULATION POWER TRANSMISSION SYSTEM

[75] Inventor: Boon Teck Ooi, Montreal, Canada

[73] Assignee: The Royal Institution for the Advancement of Learning, Quebec, Canada

[21] Appl. No.: 309,154

[22] Filed: Feb. 13, 1989

[30] Foreign Application Priority Data

Oct. 7, 1988 [CA] Canada .................. 579675

[51] Int. Cl.⁵ .......................... H02M 7/5387
[52] U.S. Cl. ...................... 363/132; 363/35; 363/95
[58] Field of Search .............. 363/35, 37, 95, 96, 363/98, 132, 137

[56] References Cited

U.S. PATENT DOCUMENTS

| | | | |
|---|---|---|---|
| 3,821,632 | 6/1974 | Rylicki | 363/96 |
| 3,864,620 | 2/1975 | Abbondanti | 363/95 |
| 3,967,173 | 6/1976 | Stitch | 363/132 |
| 4,080,554 | 3/1978 | Nordby | 363/96 |
| 4,156,275 | 5/1979 | Loberg | 363/87 |
| 4,251,735 | 2/1981 | Coleman | 363/95 |
| 4,330,817 | 5/1982 | Avar et al. | 363/37 |
| 4,358,716 | 11/1982 | Cordes et al. | 315/306 |
| 4,458,306 | 7/1984 | Galloway et al. | 363/37 |
| 4,494,179 | 1/1985 | Inokuchi et al. | 363/35 |
| 4,517,634 | 5/1985 | Sakai | 363/37 |
| 4,527,226 | 7/1985 | Glennon | 363/95 |
| 4,639,714 | 1/1987 | Crowe | 340/310 R |
| 4,639,848 | 1/1987 | Sakai | 363/35 |
| 4,680,692 | 7/1987 | Sakai | 363/35 |
| 4,685,042 | 8/1987 | Severinsky | 363/37 |
| 4,720,777 | 1/1988 | Yokoi | 363/96 |
| 4,730,242 | 3/1988 | Divan | 363/37 |
| 4,797,799 | 1/1989 | Inokuchi et al. | 363/37 |
| 4,833,584 | 5/1989 | Divan | 363/98 |
| 4,864,483 | 9/1989 | Divan | 363/132 |

OTHER PUBLICATIONS

An Integrated Controlled-Current PWM Rectifier Chopper Link for Sliding Mode Position Control—M. Nishimoto, J. W. Dixon, A. B. Kulkarni and B. T. Ooi, (Nov./Dec. 1987, IEEE, vol. 23, No. 6, pp. 1022–1028).
Transient Tests on a Voltage-Regulated Controlled-Current PWM Converter—A. B. Kulkarni, J. W. Dixon, M. Nishimoto and B. T. Ooi, (Aug. 1987, IEEE), vol. 34, No. 3, pp. 319–324.
A Three-Phase Controlled-Current PWM Converter with Leading Power Factor—B. T. Ooi, J. C. Salmon, J. W. Dixon and A. B. Kulkarni—(Jan./Feb. 1987, IEEE), vol. 23, pp. 78–84.

Primary Examiner—Patrick R. Salce
Assistant Examiner—Jeffrey Sterrett
Attorney, Agent, or Firm—Cushman, Darby & Cushman

[57] ABSTRACT

A converter for interconnecting two electric networks to transmit electric power from one network to the other, each network being coupled to a respective power generator station. The converter, having an AC side and a DC side, includes a bridge of semiconductor switches with gate turn-off capability coupled to a control system to produce a bridge voltage waveform having a fundamental Fourier component at the frequency of the electric network coupled to the AC side of the converter. The control system includes three inputs for receiving reference signals allowing to control the frequency, the amplitude and the phase angle of the fundamental Fourier component with respect to the alternating voltage of the network coupled to the AC side of the converter. Through appropriate feedback loops, the converter may be used to maintain at a predetermined level the power flowing therethrough or to keep at a preset value the voltage across the DC terminals of the converter and, in both cases, to maintain the frequency synchronism between the fundamental Fourier component and the alternating voltage of the network coupled to the DC side of the converter.

49 Claims, 16 Drawing Sheets

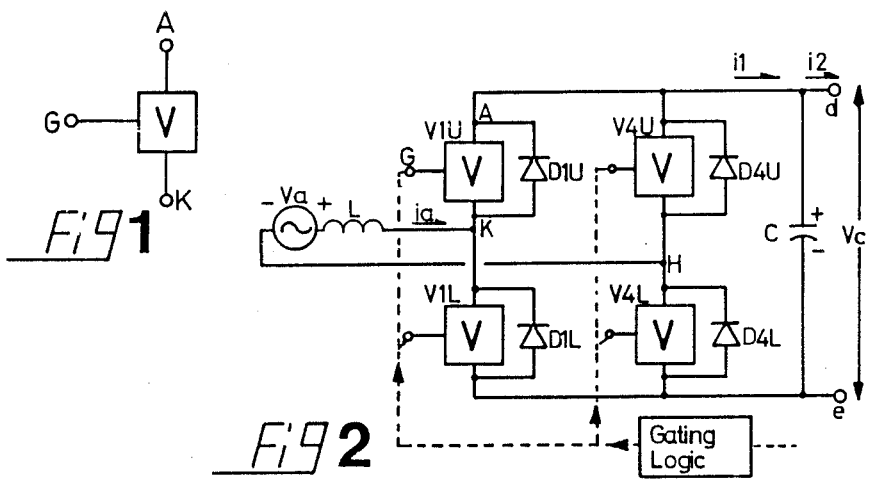
_Fig_ 1
_Fig_ 2
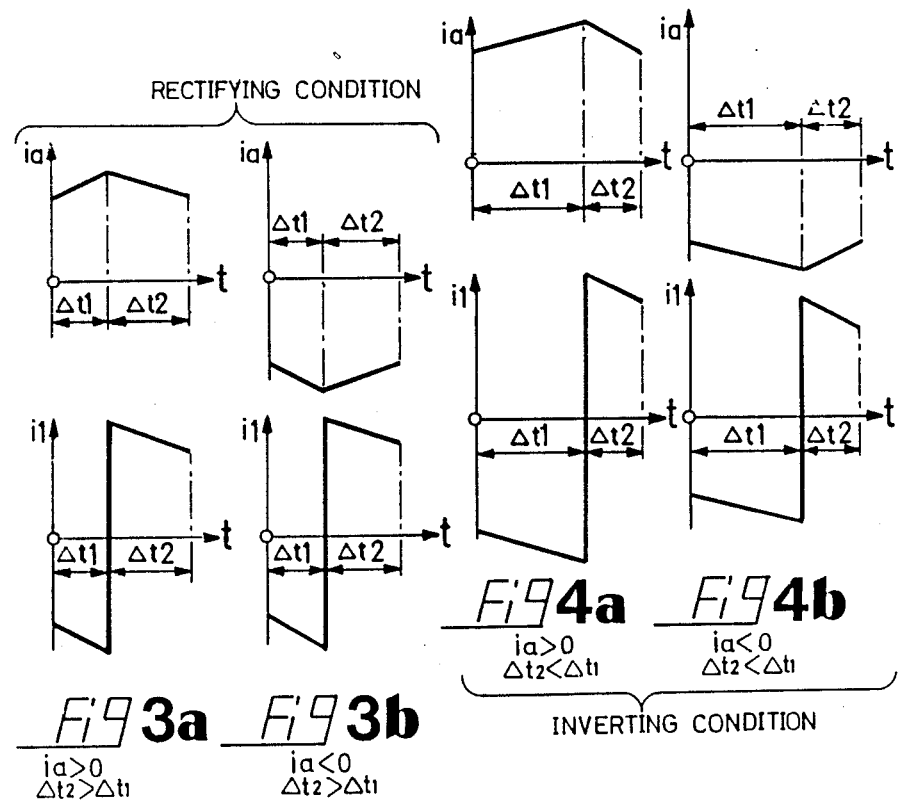
_Fig_ 3a  _Fig_ 3b
ia>0  ia<0
Δt2>Δt1  Δt2>Δt1
_Fig_ 4a  _Fig_ 4b
ia>0  ia<0
Δt2<Δt1  Δt2<Δt1
INVERTING CONDITION

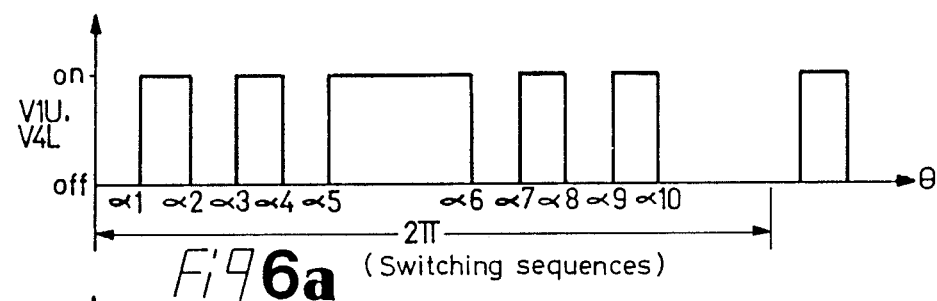
Fig 6a (Switching sequences)
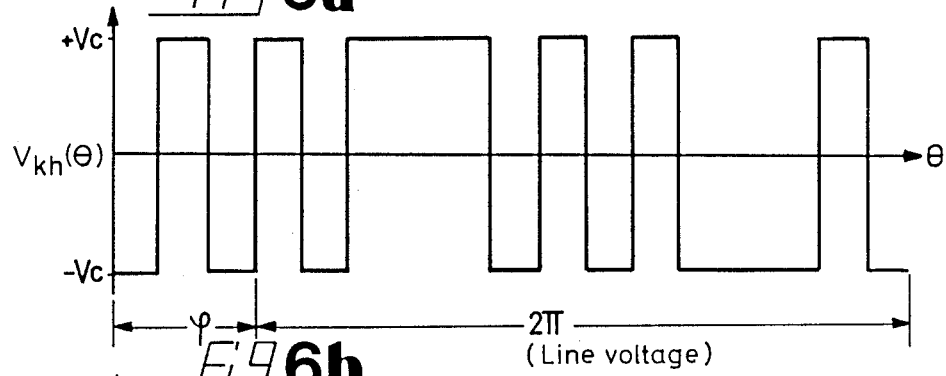
Fig 6b (Line voltage)
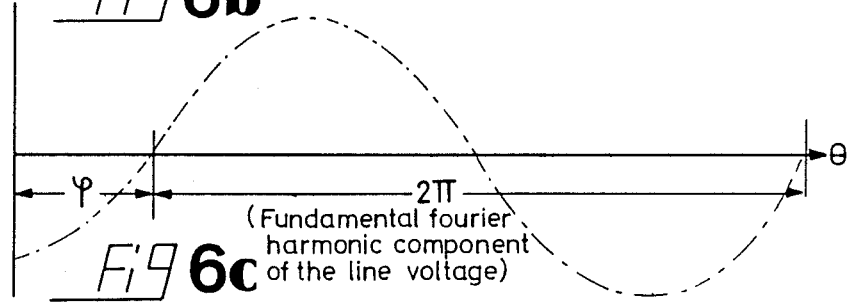
Fig 6c (Fundamental fourier harmonic component of the line voltage)
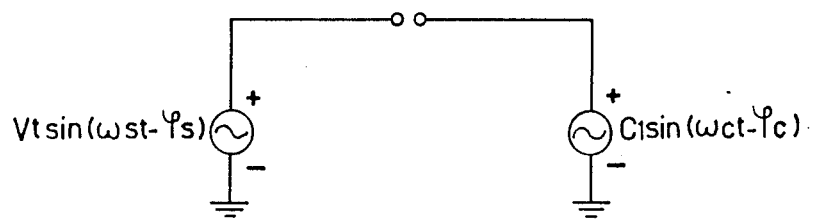
Fig 8

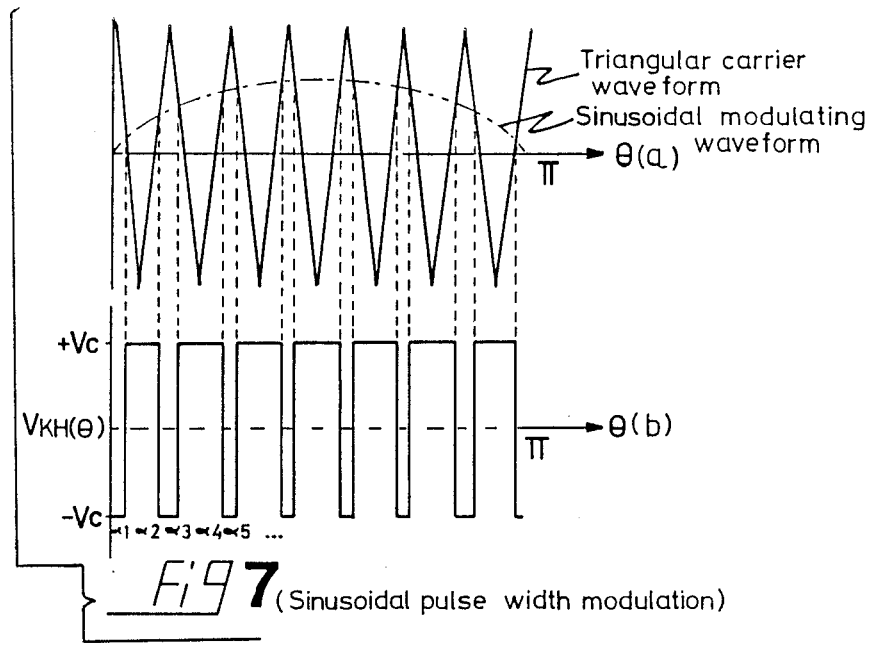
Fig 7 (Sinusoidal pulse width modulation)
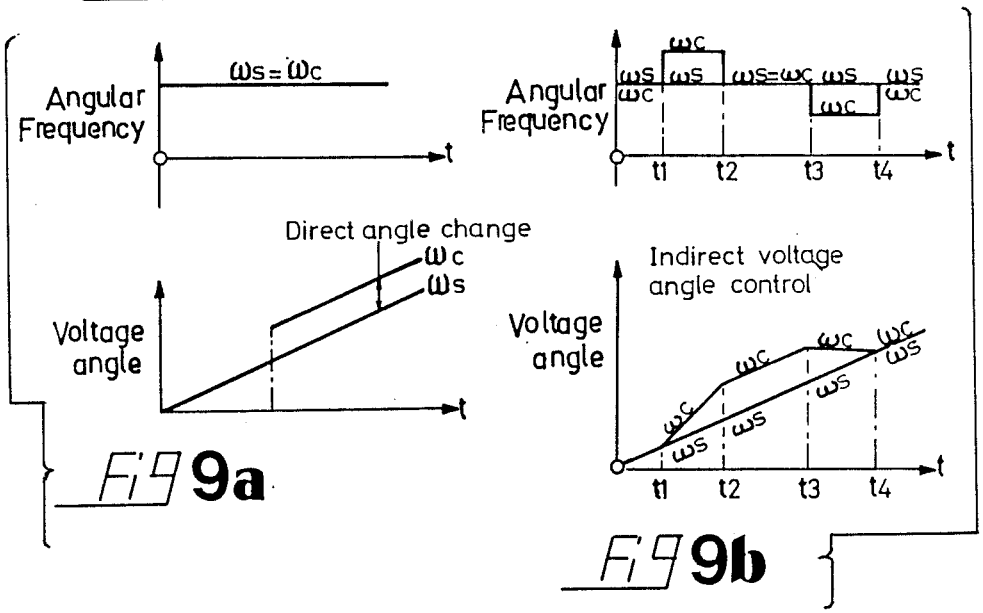
Fig 9a
Fig 9b

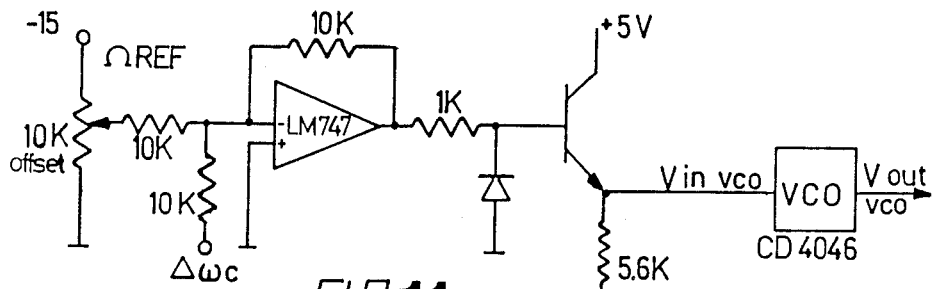
_Fig_ 11a
Ω REF: Reference frequency setting
△ωc: Feedback control terminal
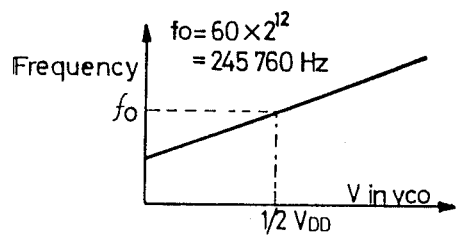
_Fig_ 11b
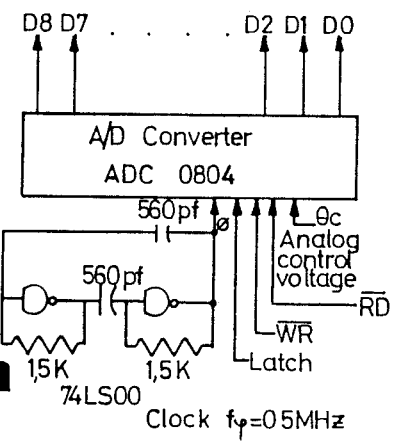
_Fig_ 13a
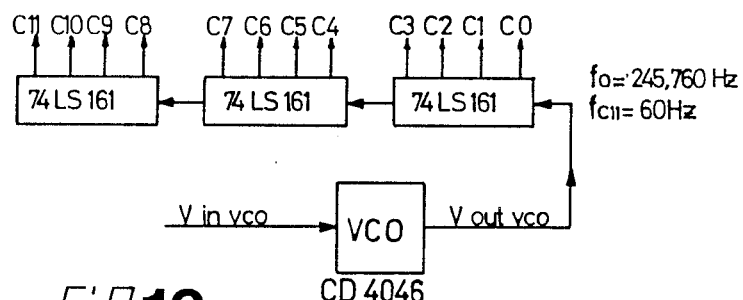
_Fig_ 12

A/D Converter Table
| Analog Voltage | Binary Output | | | | | | |
|---|---|---|---|---|---|---|---|
| $\theta_c$ | D8 | D7 | D6 | D5 | ... | D1 | D0 |
| 5V | 0 | 0 | 1 | 1 | ... | 1 | 1 |
| ... | ... | ... | ... | ... | ... | ... | ... |
| ... | 0 | 0 | 0 | 0 | ... | 1 | 1 |
| ... | 0 | 0 | 0 | 0 | ... | 1 | 0 |
| ... | 0 | 0 | 0 | 0 | ... | 0 | 1 |
| 25 V | 0 | 0 | 0 | 0 | ... | 0 | 0 |
| ... | 1 | 1 | 1 | 1 | ... | 1 | 1 |
| ... | ... | ... | ... | ... | ... | ... | ... |
| ... | 1 | 1 | 0 | 0 | ... | 1 | 1 |
| ... | 1 | 1 | 0 | 0 | ... | 1 | 0 |
| ... | 1 | 1 | 0 | 0 | ... | 0 | 1 |
| ... | 1 | 1 | 0 | 0 | ... | 0 | 0 |
$\Delta V = 0.0195 \ mV = \dfrac{5V}{256}$
Fig. 13b
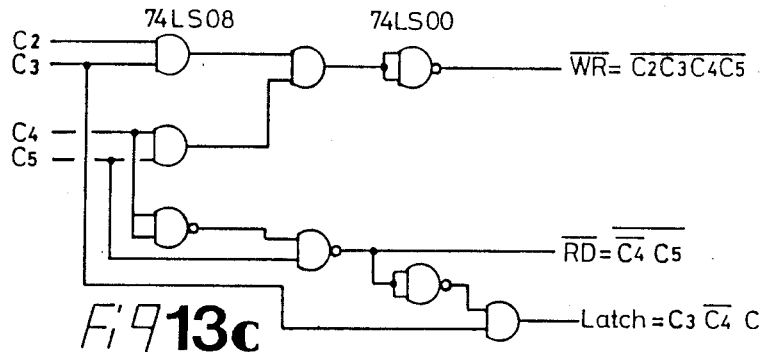
Fig. 13c
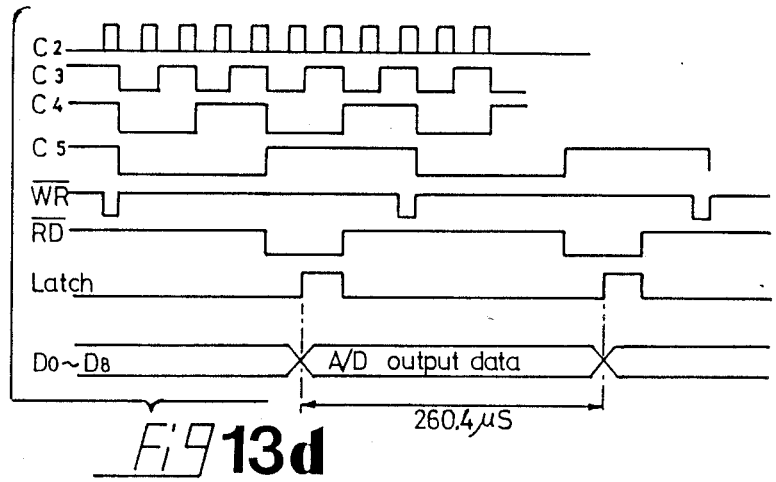
Fig. 13d

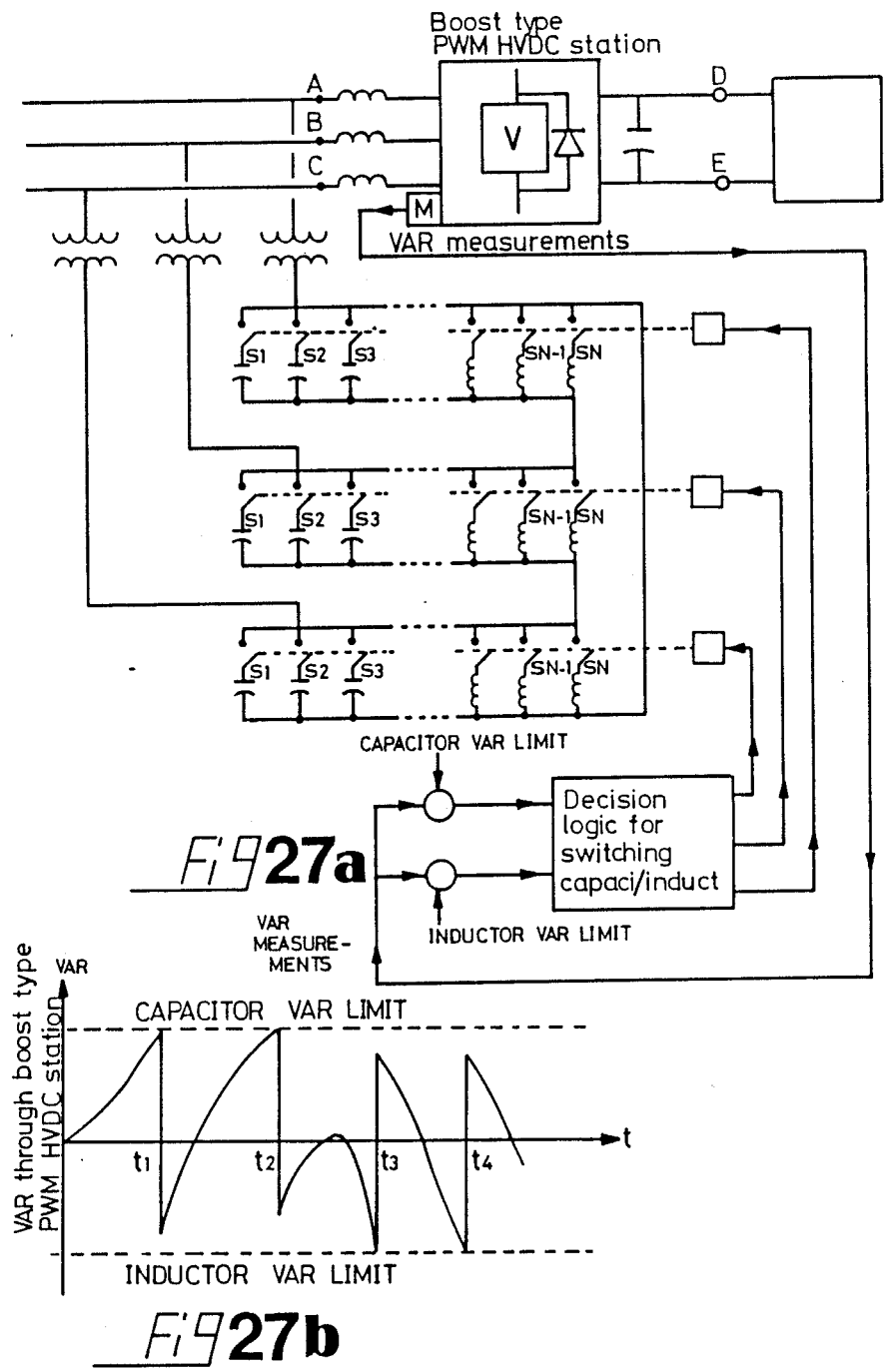

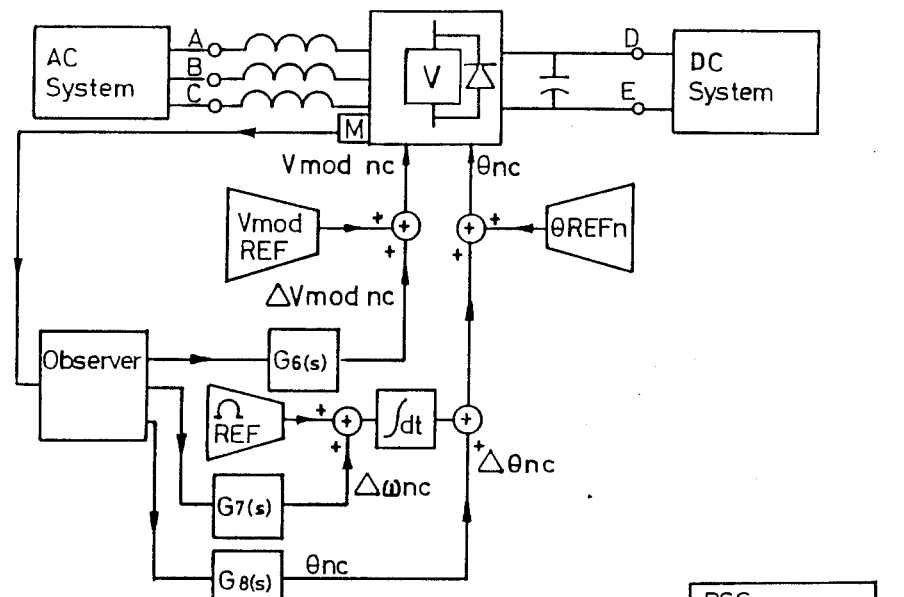
Fig 29
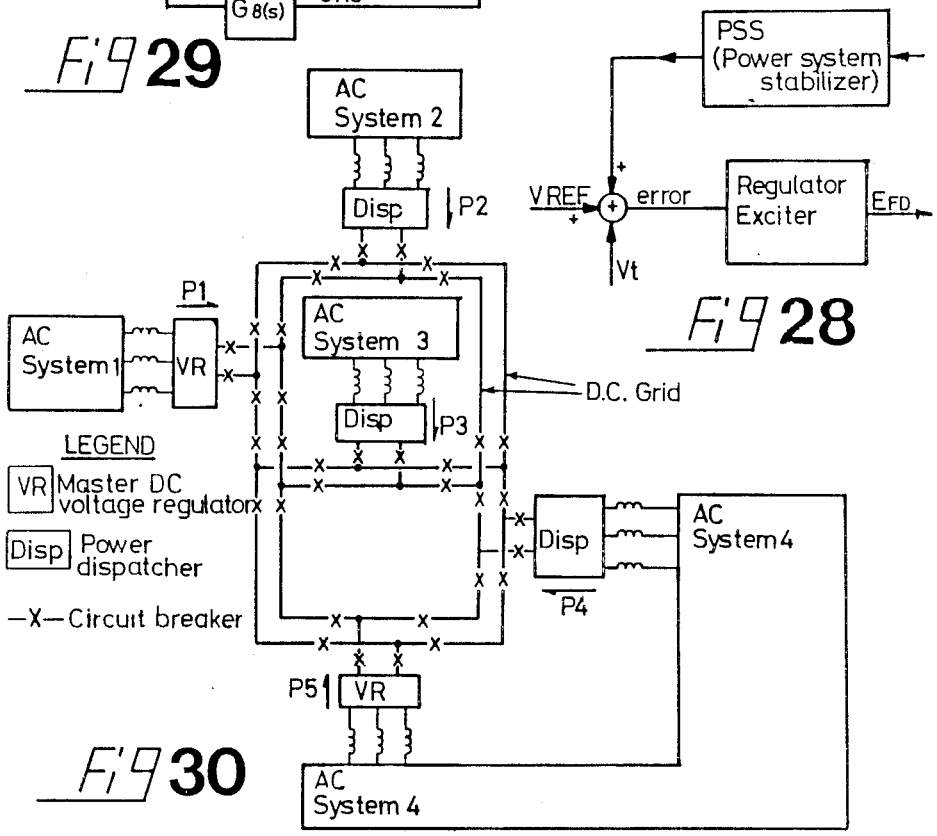
Fig 28
Fig 30

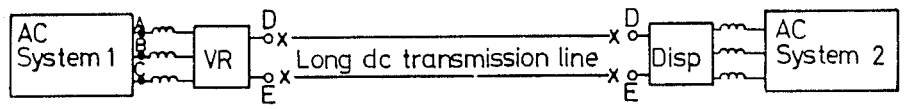
_Fig_ 31
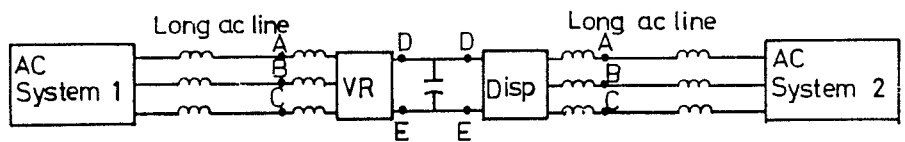
_Fig_ 32
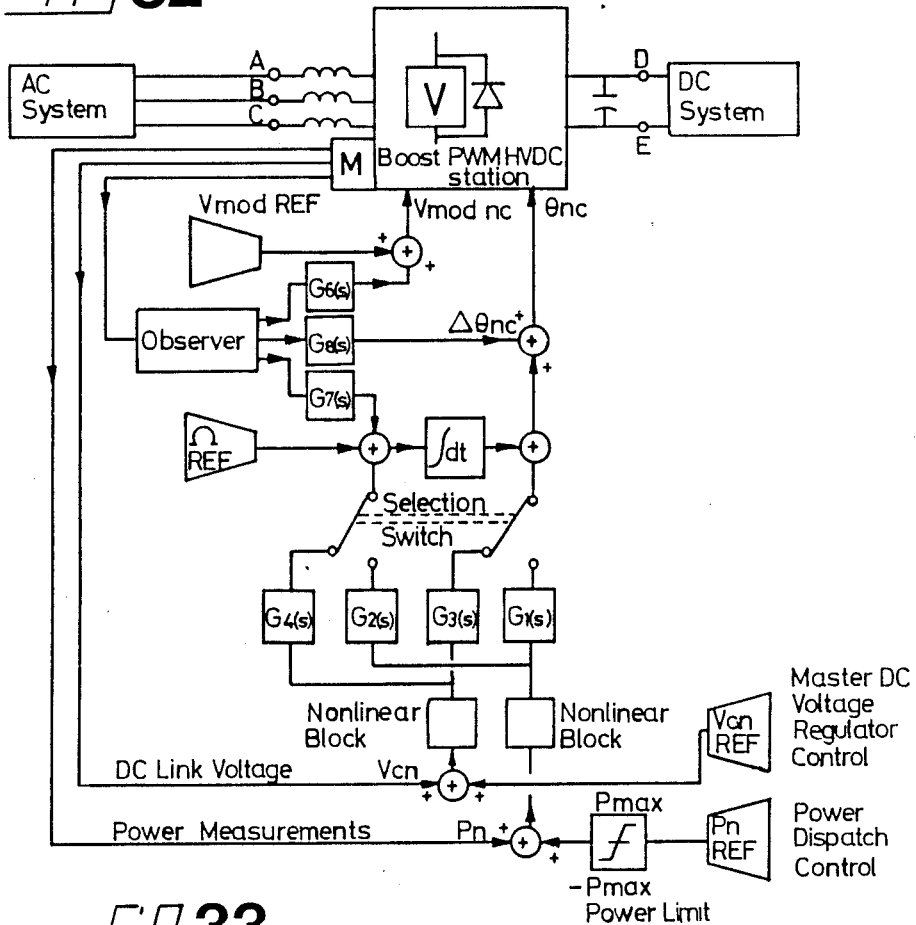
_Fig_ 33

PULSE WIDTH MODULATION POWER TRANSMISSION SYSTEM

FIELD OF THE INVENTION

The present invention relates to the general field of electric power generation and transmission and more particularly, to a novel converter for use in a High Voltage Direct Current power transmission system, operating in accordance with a pulse-width modulation principle. The invention also extends to methods for operating the converter.

BACKGROUND OF THE INVENTION

The invention described in this application may be considered as belonging to the third generation High Voltage Direct Current (HVDC) system. The first generation is centered around the technology of the mercury arc rectifier, the second around the thyristor. Because of the advent of high power and high frequency semiconductor switches with fast turn-off capabilities (e.g. GTO's, MCT's, etc . . . ) the pulse-width modulation (PWM) technique, may be applied for bulk power transmission of the utilities. The exploitation of the PWM technique constitutes the third generation HVDC system.

Because the thyristor generation of HVDC has been developed at considerable costs, industry is not inclined to invest heavily on another new technology if the gains are merely marginal. The invention described in this application not only enables HVDC systems to perform their existing functions better but also it enables tasks to be performed which are not possible with thyristor technology.

Drawbacks of conventional HVDC Systems

Because the mercury arc rectifier and the thyristor cannot be turned off through the gate, line communtation is used. The existing converter stations are designed around this need of the negative half of the AC voltage cycle to discontinue the conduction of the valve. As a result, the present HVDC converter stations are inherently flawed. They are used because there have been no better alternatives. The literature on conventional HVDC is a catalog of patch-work measures to remedy this fatal flaw. The following are examples:

(i) The conventional HVDC station is a polluter of low order harmonic components. The harmonics are suppressed by filters which contribute to a substantial fraction of the cost;

(ii) The conventional HVDC station cannot operate with leading power factor and again capacitors have to be used when the occasion arises;

(iii) There is no active AC voltage support at the conventional HVDC station. When the station is situated in the context of a weak long AC transmission link, AC voltage collapse can occur. The AC voltage has to be supported by switched capacitors in conjunction with static VAR controllers;

(iv) On the AC side, the conventional HVDC station does not fit snugly with the AC utility system. This is because real power control is achieved indirectly through controlling the phase angle between the voltage phaser and the current phaser at the AC terminals. The AC voltage is not an active voltage source. Instead, it is a voltage based on subtracting the voltages across the transmission lines from the active voltages of the generation stations. As a result, the AC voltage at the terminals change with the load current to the HVDC station itself. The fit is less comfortable still because the HVDC station cannot handle leading power factor. Thus infeasible operation situations abound and their occurrences have been blamed on "Voltage Collapse";

(v) The conventional HVDC stations handle unidirectional DC current flow only. Power reversals are accomplished by DC voltage reversals. This is a handicap for conventional multi-terminal configurations; and (vi) The conventional HVDC stations are inherently "DC current sources". When conventional HVDC stations have to be connected in a multi-terminal configuration, patch work measures have to be devised to make them have the appearance of equivalent voltage sources for power sharing. In multi-terminal configuration, the conventional stations can deliver unidirectional power only.

OBJECT OF THE INVENTION

The principal object of the invention is to provide a converter system for use with a HVDC power transmission system, and methods for operating same in order to alleviate the shortcomings of conventional converter systems operating with mercury arc rectifiers and thyristors.

The converter, according to the invention, basically serves as a link between two networks for power transmission in bulk of the utilities. One of the networks has DC link terminals for connection to the converter, the other network has AC link terminals for connection to the converter. The converter uses an array of semiconductor switch devices with turn-off capabilities other than line commutation, such as gate turn-off capabilities or forced commutation, among others.

This basic structure permits to implement strategies to control the converter according to a PWM principle to achieve an added degree of freedom in control which overcomes many of the well known objections and limitations of existing converter stations.

In a preferred embodiment, the PWM converter, according to the invention, may be used to perform the following tasks:

(a) a voltage angle control;
(b) voltage amplitude control;
(c) power flow control;
(d) VAR control;
(e) stability and dynamic performance enhancement; and
(f) multi-terminal HVDC transmission.

For the purpose of briefly illustrating the invention, examples of PWM converters will be given hereinafter, performing the above listed functions. However, this brief description should not be interpreted in a limiting manner because variations are possible without departing from the spirit of the invention.

(A) Voltage Angle Control

In conventional AC transmission practice, real power is controlled through the voltage angle and reactive power through the voltage amplitude. Strictly speaking, the real and reactive powers are not decoupled. The conventional practice is adopted here as a rough rule of the thumb. In generation stations, both the voltage angle control and the voltage amplitude control are provided by the speed governor control and the field excitation control respectively.

The PWM converter, according to the invention, has the same AC voltage angle control over the real power and AC voltage amplitude control over the reactive power. Thus, the PWM converter has the same control attributes as the generator stations and needs not be treated as a special case in load flow studies. Furthermore, since the PWM converter operates with semiconductor switches, it is expected to have faster time response than a generator station where long time constants, associated with the governor control and field excitation control, are present.

With the PWM converter, according to the invention, the voltage angle may be changed indirectly by time integration of the input frequency or directly by adding or subtracting a designated angle.

The PWM converter has two inputs for its voltage angle control:

(1) a frequency control input by which indirect voltage angle control is achieved by integration of the frequency command signal; and (2) a voltage angle control input by which the direct voltage angle control is achieved.

The frequency control input is an analog voltage applied to a Voltage Controlled Oscillator (VCO) whose pulse rate is proportional to the input voltage. The pulses are counted by binary counter. The counting corresponds to integration of the frequency. The instantaneous value of the counter output is representative of the voltage angle which, thus, is indirectly controlled through the frequency control input.

The voltage angle control input which is the direct angle control, is an analog signal first converted by an analog-to-digital (A/D) converter to a binary number. A binary adder sums this binary number with the binary number outputed by the binary counter. The sum is then used as an address to an erasable-programmable read only memory (EPROM) which serves as look-up tables. The look-up tables contain the discretized values of sinusoidal waveforms, constituting modulating signals, and a triangular waveform, constituting a carrier signal.

As the VCO keeps pulses, the look-up tables are scanned so that the sinusoidal modulating waveforms and the triangular carrier waveform are reconstituted by digital-to-analog (D/A) converters, semiconductor switches of the PWM converter being triggered at the intersections of the modulating waveform and the carrier waveform.

The pulse rate of the VCO determines the frequency of the voltage output of the PWM converter. The VCO can also control indirectly the voltage angle with respect to a fixed frequency reference. This is done by "jogging" the frequency control. To advance the voltage angle, the frequency is increased momentarily from the fixed reference. To retard the voltage angle, the frequency is decreased momentarily from the fixed reference.

The direct voltage angle control simply adds or subtracts the desired angle without passing through the frequency control.

With the PWM converter, according to the invention, real power may be controlled by adjusting the voltage angle. This conforms to the practice of real power control in generator stations.

It is by retarding or advancing the voltage angle of the PWM converter, with respect to that of the AC utility system to which it has been synchronized, that the converter is made to operate as a rectifier or an inventor.

(B) AC Voltage Amplitude Control

In a PWM converter, control of the voltage amplitude is highly desirable in order to achieve control over the reactive power flowing through the converter or to maintain the voltage amplitude constant at the AC side of the converter.

To keep the AC voltage constant, the amplitude of the fundamental Fourier harmonic component of the AC voltage is maintained constant in spite of minor variations of the voltage in the DC link. Such voltage fluctuations are mainly due to load variations because of the voltage drop at the DC lines due to their resistivity. Since in a HVDC converter, the AC voltage is supported by the DC voltage, such fluctuations are reflected on the AC side.

To compensate for possible DC voltage variations, the PWM converter, according to the invention, is provided with a feedback loop to measure the DC voltage and compensate for its variations by adjusting accordingly the amplitude of the fundamental Fourier harmonic component at the AC side of the converter.

With a conventional converter, an AC voltage regulator would have been used. This would have consisted of measuring the AC voltage amplitude, comparing it with the desired reference and applying the error signal in a feedback loop to a voltage amplitude control.

The advantage of the invention is that the converter is not encumbered by an unnecessary feedback loop. This frees the voltage amplitude control for execution of other tasks such as: (1) reactive power control and (2) stability and dynamic performance enhancement.

In order to maintain the DC voltage constant across the DC link capacitor, the PWM converter must rectify (or invert) the right amount of AC power so as to balance the DC power leaving (or entering) the DC link terminals in order to prevent the charge and hence the voltage across the DC link capacitor from changing. In consequence, there is at least one PWM converter where the DC voltage is maintained constant, designated hereinafter as "master DC voltage regulator" and it is basically a power slack and ensures that the power balance of the DC network can be maintained.

Maintaining the power flow through the PWM converter may be achieved through a frequency and a voltage angle lock loop, as it will be explained in detail in the next section.

From the above, it appears that a PWM converter is an active voltage controller and this contrasts favorably against the passiveness of the conventional line commutated converters. Viewing the fundamental Fourier series component of voltages at the AC terminals of the PWM converter as equivalent AC voltage sources, the three attributes of the AC voltage are directly controllable.

(1) the amplitude;
(2) the frequency; and
(3) the voltage phase angle.

The direct control over these three attributes enables the PWM converter to have a significant role to play in matching load flow requirements in damping inter-system oscillations and in stabilizing the power pool.

(C) Power Flow Control

Power flow through a PWM converter can be controlled by adjusting the voltage angle. A PWM converter whose task is mainly to control the real power flow therethrough is designated hereinafter as "power dispatcher".

There are several ways of measuring the real power: AC wattmeter, DC wattmeter, or DC link current (assuming that the DC link voltage is held constant). The measured power is compared to the power assignment and the error is applied to the frequency control and the direct voltage control of the voltage angle controller in a negative feedback loop. The power assignment may be for positive power (rectifier) or for negative power (inverter). The voltage angle controller will adjust the voltage angle with respect to the rest of the AC system until the assigned power is delivered. The assigned power is maintained in spite of: (1) the frequency drifts (2) the circuit topology changes arising from changes in unit commitment and (3) load flow changes of the AC utility system.

Whether the PWM converter operates as a power dispatcher or as a master DC voltage regulator, preferably the voltage angle control is exclusively employed to maintain the assigned power or the slack power. The voltage amplitude control may then be used for stabilify and dynamic performance enhancement.

(D) VAR Control

The power dispatcher and/or the master DC voltage regulator operating with current phase angles ranging from 0° to 360°, are themselves statis VAR controllers provided the current ratings of the converters are sufficient. While the assigned real power or slack power is delivered, the reactive power is automatically handled by the station provided the MVA rating is high enough. Switched capacitors and inductances can also be used which are placed in parallel at the AC terminals of the power dispatchers and/or the master DC voltage regulators for the purpose of reducing the MVA ratings of the converters and hence the overall cost. A PWM converter station is rated to control static VARs within a limited range. The station is equipped with transducers which measure VARs. As the upper limit of the VAR range is exceeded, a capacitor is switched ON. Alternatively when the lower limit is reached, a capacitor is switched OFF. When all the capacitors in the bank have been switched OFF, an inductance from the inductor bank is switched ON.

The switched capacitors and/or switched inductors control the VARs in quantum steps. Between any two quantum steps, the continuous adjustment of the VARs is provided by the PWM converter. This would normally have to be provided by SVC (Static VAR controllers) in conventional converter stations.

(E) Stability and Dynamic Performance Enhancement

An interconnected system consisting of one or several AC systems integrated together by a DC network consisting of two or more PWM converters may have eigen-modes which are lightly damped or eigen-modes which are on the verge of instability.

In many cases, by pole shifting techniques or by other well-known methods of control, the lightly damped or marginal stable modes can be made to have improved damped response provided control leverages exist for introducing the control feedback signals. A PWM converter offers 3 levers of control for stability and dynamic performance enhancement: (1) voltage amplitude control, (2) frequency control (3) direct voltage angle control.

In both the power dispatcher and the master DC voltage regulator modes, the frequency control and the voltage angle control have been used in a frequency and voltage angle lock-loop to track the power assignment or the DC voltage reference. Nevertheless, both the frequency control and the voltage angle control can still be used with feedback loops for stability and dynamic performance enhancement, if necessary.

In both the power dispatcher and the master DC voltage regulator modes, the voltage amplitude control has been deliberately left unencumbered of specific duties requiring feedback loops. The intent is to dedicate this control for stability and dynamic performance enhancement.

In a PWM converter, in accordance with the invention, the three controllers: voltage amplitude, frequency and voltage angle, can be used in conjunction with feedback signals to stabilize unstable modes or to damp out lightly damped modes. The details of the design depend on the circumstances. The eigen-mode whose performance needs enhancement must be "controllable" by any one of the three control levers.

The feedback signal may be the real power, the reactive power, the line frequency, the DC link voltage, etc. The eigen-mode in question must be observable in the feedback signal.

The design of the feedback loops is specific to the circumstances by which the instability or the light damping arises.

The feedback controls may be analog, digital or computer controlled.

(F) Multi-terminal HVDC Transmission

In a system where two or more PWM converters are connected in parallel to a DC network comprising a positive transmission bus line and a negative transmission bus line, the DC voltage across the bus lines is maintained by at least one master DC voltage regulator. More than one master DC voltage regulator may be used, in which case, the division of the slack power is controlled by the settin of the DC voltage reference at each master DC voltage regulator.

The remaining PWM converters operate as power dispatchers. Each power dispatcher regulates the rectified or inverted power assigned to it by load control.

The master DC voltage regulator also operates by local control, but in maintaining the regulated voltage across its DC link capacitor it always ensures that the DC power leaving or entering the DC terminals is at all times balanced by the rectified or inverted AC power. Thus the local control enables the power balance to be satisfied even though the power dispatcher stations are remotely located.

The bidirectional power exchange capability of each converter station is an important asset here.

A special case of the multi-terminal HVDC transmission described consists of a long radial DC transmission system between a rectifier station at the source of AC power and an inverter station at the sink of another AC power system. In this case, the PWM converters consist of a dedicated rectifier station at the source end and a dedicated inverter station at the sink end. Depending on the application, the power dispatcher can be at either the rectifier end or the inverter end. The opposite member of the pair is the master DC voltage regulator.

Another special case of multi-terminal HVDC Transmission is the back-to-back asynchronous link joining two AC systems together which are at the same or at different frequency standards but which have disparate voltage angles. One PWM converter operates as a master DC voltage regulator and the other member of the pair operates as a power dispatcher.

When the AC transmission line of the link is long, the asynchronous link can be located at the mid-distance which is its optimal location. The master DC voltage regulator in supporting the DC link voltage, also supports the AC voltages so that static VAR compensators are not needed. Switched capacitors may be incorporated mainly to reduce the MVA of the converters and therefore their cost.

Therefore, the invention comprises, a converter for interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given substantially fixed frequency across the AC link terminals, the converter comprising:

a bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

capacitor means across the DC link terminals;

valve control means coupled to the bridge for commanding the valves thereof to switch state, the valve control means including:

(a) signal generating means for outputting a control signal representative of a desired valve state switching sequence to obtain a bridge voltage waveform having a fundamental Fourier component at a frequency corresponding substantially to the frequency of the alternating voltage; and (b) frequency control means coupled to the signal generating means to adjust the control signal in accordance with a drift of the frequency of the alternating voltage to cause the frequency of the fundamental Fourier component to track the frequency of the alternating voltage.

The invention also extends to a converter for interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given substantially fixed frequency across the AC link terminals, the converter comprising:

a bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

valve control means coupled to the bridge for commanding the valves thereof to switch state, the valve control means including:

(a) signal generating means for producing a valve state switching signal to obtain a bridge voltage waveform having a fundamental Fourier component at a certain frequency, with a certain amplitude and a certain phase angle with the alternating voltage;

(b) memory means coupled to the signal generating means, in the memory means being stored control data allowing to generate different valve state switching signals, each allowing to obtain a bridge voltage waveforem with a fundamental Fourier component at a different frequency;

(c) a controlled oscillator for receiving a signal representative of the desired frequency of the fundamental Fourier component and generating in response to the signal an oscillatory signal representative of the desired frequency;

(d) counter means coupled to the controlled oscillator and to the memory means, the counter means counting the oscillations of the oscillatory signal and generating an output signal allowing the memory means to retrieve and output control data allowing the signal generating means to generate a valve state switching signal to obtain a bridge voltage waveform with a fundamental Fourier component at the desired frequency.

The invention also comprehends a converter for interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given substantially fixed frequency across the AC link terminals, the converter comprising:

a bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

valve control means coupled to the bridge for commanding the valves thereof to switch state, the valve control means including:

(a) signal generating means for outputting a valve state switching signal to obtain a bridge voltage waveform having a fundamental Fourier component at a certain frequency and at a certain phase angle with the alternating voltage; and (b) frequency and phase angle control means coupled to the signal generating means, the frequency and phase angle control means including:

(i) a first signal processing circuit for receiving a signal representative of a desired frequency of the fundamental Fourier component and generating in response an output signal whose instantaneous value is representative of the voltage angle of the fundamental Fourier component with respect to a certain reference;

(ii) a second signal processing circuit having first and second inputs and an ouput, the first input being coupled to the first signal processing circuit and the output to the signal generating means, the signal processing circuit receiving at a second input a signal representative of a desired phase angle between the fundamental Fourier component and the alternating voltage and outputing a signal allowing the signal generating means to produce a valve state switching signal to obtain a bridge output waveform having a fundamental Fourier component at the desired frequency and at the desired phase angle with the alternating voltage.

The invention also comprises a converter for interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given substantially fixed frequency across the AC link terminals, the converter comprising:

a bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

valve control means coupled to the bridge for commanding the valves thereof to switch state, the valve control means generating a valve state switching signal to obtain a bridge voltage waveform having a fundamental Fourier component at a certain frequency, at a certain phase angle with the alternating voltage and having a certain amplitude, the valve control means including:

(a) a frequency input means for receiving a signal representative of a desired frequency of the fundamental Fourier component;

(b) a phase angle input means for receiving a signal representative of a desired phase angle between the fundamental Fourier component and the alternating voltage; and (c) an amplitude input means for receiving a signal representative of a desired amplitude of the fundamental Fourier component, the valve control means processing the signals received at the frequency input, phase angle input and amplitude input means and outputting a valve state switching signal for obtaining a bridge output waveform with a fundamental Fourier component at the desired frequency at the desired phase angle with the alternating voltage and having the desired amplitude.

The invention also extends to a converter for interconnecting a first electric network and a second electric network to maintain the flow of real power from one network to the other at a predetermined value, each of the networks being coupled to a respective active power source, the first network including DC link terminals for coupling the first network to the converter, the second network including AC link terminals for coupling the second network to the converter, there being an alternating voltage at a given frequency across the AC link terminals, the converter comprising:

a bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

valve control means coupled to the bridge to command the valves thereof to switch state to obtain a bridge voltage waveform with a fundamental Fourier component having a frequency corresponding substantially to the frequency of the alternating voltage, the valve control means including a phase angle input means for receiving a phase angle signal representative of a desired phase angle between the fundamental Fourier component and the alternating voltage, in response to the phase angle signal the valve control means outputting a valve state switching signal to obtain a bridge voltage waveform having a fundamental Fourier component at the desired phase angle with the alternating voltage;

signal processing circuit coupled to the phase angle input means, the signal processing circuit outputting the phase angle signal;

feed back means coupled to the signal processing circuit, the feedback means producing an error signal representative of a difference between the amount of real power flowing through the converter and the predetermined value, the signal processing means receiving the error signal and altering the phase angle signal in accordance with the error signal allowing to obtain a bridge voltage waveform with a fundamental Fourier component at a phase angle with the alternating voltage corresponding to a real power flow through the converter at the predetermined value.

The invention also comprises a converter for interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given frequency across the AC link terminals, the converter maintaining a voltage across the DC link terminals at a predetermined value, the converter comprising:

A bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

valve control means coupled to the bridge to command the valves thereof to switch state to obtain a bridge voltage waveform with a fundamental Fourier component having a frequency corresponding substantially to the frequency of the alternating voltage, the valve control means including a phase angle input means for receiving a phase angle signal representative of a desired phase angle between the fundamental Fourier component and the alternating voltage, in response to the phase angle signal the valve control means outputting a valve state switching signal to obtain a bridge voltage waveform having a fundamental Fourier component at the desired phase angle with the alternating voltage;

signal processing circuit coupled to the phase angle input means, the signal processing circuit outputting the phase angle signal;

feedback means coupled to the signal processing circuit, the feedback means producing an error signal representative of a difference between the voltage across the DC link terminals and the predetermined value, the signal processing means receiving the error signal and altering the phase angle signal in accordance with the error signal allowing to obtain a bridge voltage waveform with a fundamental Fourier component at a phase angle with the alternating voltage corresponding to a voltage across the DC link terminals at the predetermined value.

The invention also extends to a process for controlling the amount of real power flowing through a converter interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given frequency across the AC link terminals, the converter comprising:

a bridge of valves, each valve of the bridge being capable of assuming two different states, namely an ON state and an OFF state, in the ON state the valve allowing current to pass therethrough, in the OFF state the valve blocking the passage of current;

inductor means between the bridge and the AC link terminals;

valve control means coupled to the bridge to command the valves thereof to switch state to obtain a bridge voltage waveform with a fundamental Fourier component having a frequency corresponding substantially to the frequency of the alternating voltage, the valve control means including a phase angle input means for receiving a phase angle signal representative of a desired phase angle between the fundamental Fourier component and the alternating voltage, in response to the phase angle signal the valve control means outputing a valve state switching signal to obtain a bridge voltage waveform having a fundamental Fourier component at the desired phase angle with the alternating voltage, the process comprising the step of:

varying the phase angle signal to bring the amount of real power flowing through the converter at a desired value.

The invention also extends to a process for controlling the voltage across the DC terminals of a converter interconnecting a first electric network and a second electric network to transmit electric power from one network to the other, each of the networks being coupled to a respective active power source, the first network including DC link terminals for coupling the first network to the converter, the second network including AC link terminals for coupling the second network to the converter, there being an alternating voltage at a given frequency across the AC link terminals, the converter comprising:

a bridge of valves, each valve of the bridge being capable of assuming two different states, namely an ON state and an OFF state, in the ON state the valve allowing current to pass therethrough in the OFF state the valve blocking the passage of current;

inductor means between the bridge and the AC link terminals;

valve control means coupled to the bridge to command the valves thereof to switch state to obtain a bridge voltage waveform with a fundamental Fourier component having a frequency corresponding substantially to the frequency of the alternating voltage, the valve control means including a phase angle input means for receiving a phase angle signal representative of a desired phase angle between the fundamental Fourier component and the alternating voltage, in response to the phase angle signal the valve control means outputing a valve state switching signal to obtain a bridge voltage waveform having a fundamental Fourier component at the desired phase angle with the alternating voltage, the process comprising the step of:

varying the phase angle signal to bring the voltage across the DC link terminals to a desired value.

The invention also comprises, in combination:

a positive DC bus;

a negative DC bus;

a first electric network coupled to an active power source, the first electric network including AC link terminals, there being an alternating voltage across the AC link terminals;

a second electric network coupled to an active power source, the second electric network including AC link terminals, there being an alternating voltage across the AC link terminals of the second electric network;

a first converter coupled to the AC link terminals of the first network, the first converter including DC link terminals coupled to the buses;

a second converter coupled to the AC link terminals of the second network, the second converter including DC link terminals coupled to the buses, each converter including:

(a) a bridge of valves, each valve of the bridge being capable of assuming two different states, namely an ON state and an OFF state, in the ON state the valve allowing current to pass therethrough, in the OFF state the valve blocking the passage of current;

(b) inductor means between the bridge and the AC link terminals of the network coupled to the converter;

(c) valve control means coupled to the bridge for commanding the valves thereof to switch state to obtain a bridge voltage waveform having a fundamental Fourier component at a certain frequency and at a certain phase angle with the alternating voltage at the AC link terminals of the network coupled to the converter, the valve control means including a phase angle input means for receiving a signal representative of a desired phase angle between the fundamental Fourier component and the alternating voltage at the AC link terminals of the network coupled to the converter, in response to the signal received through the phase angle input means the valve control means generating a valve state switching signal to obtain a fundamental Fourier component at the desired phase angle with the alternating voltage at the AC link terminals of the network coupled to the converter, first signal processing circuit coupled to the phase angle input means of the valve control means of the first converter, the first signal processing circuit generating a signal to control the phase angle between the fundamental Fourier component of the first converter and the alternating voltage at the AC link terminals of the first network to maintain the voltage across the DC link terminals of the first converter generally constant; and second signal processing circuit coupled to phase angle input means of the valve control means of the second converter, the second signal processing circuit generating a signal to control the phase angle between the fundamental Fourier component of the second converter and the alternating voltage at the AC link terminals of the second network to maintain the amount of real power flowing through the second converter at a predetermined level.

List of Advantages of PWM converter (i) The PWM converter, according to the invention, substantially suppresses low order voltage and current harmonics. The residual harmonics are in the high frequency end of the spectrum where harmonic filters for them are relatively cheap;

(ii) A network with PWM converters, according to the invention, allows the power angle to be varied over a 360° range. Operation with leading power factor is not a problem as is the case with conventional line-commutated HVDC converters;

(iii) Real power is controlled by the voltage angle. This mode of power control is identical to that of all AC generator stations in the power utility industry. The PWM converter dovetails with a close fit into the AC utility system;

(iv) Reactive power is controlled by the AC voltage amplitude. This mode of VAR control is identical to that of all AC generator stations in the power utility industry. Static VAR controllers as in the case of conventional line commutated HVDC converters are no longer essential;

(v) In addition to control over the real power and reactive power, the three levers of control (voltage angle, voltage amplitude and frequency) allow feedback control systems to be installed for the purpose of improving the system stability and dynamic performance. In all AC generator stations of the power utilities, such control is achieved through the governor and the filed excitation regulator. The PWM converter is not encumbered by the long time constants associated with the speed governors and with the generator field inductance. For this reason, the PWM converter is expected to surpass the performance of the AC generator station in providing dynamic enhancement in the utility system;

(vi) The controllable AC voltage amplitude of the PWM converter is an active, self sustaining voltage. There is little possibility of voltage collapse, of the type encountered in conventional line commutated converters with long, weak AC transmission lines.

When used as a back-to-back asynchronous tie, the PWM converter rectifier/inverter can be located at the half-way point of the long, weak AC transmission line. The half-way point is the optimum position as it enables the transmission of twice the real power which is now being transmitted by conventional line commutated converter stations because these stations are situated at one end of the transmission line;

(vii) On the DC link side, the PWM converter operates with unidirectional voltage. Power reversals are accomplished by reversal in the directions of DC link current flow. By comparison, the conventional line commutated converter stations operate with unidirectional current flow and power reversals are accomplished by DC link voltage reversals;

(viii) On the DC link side, the PWM converter can operate at fixed DC link voltage. When the power through the station is varied, the variation is reflected in the amplitude of the DC link current. Thus, these stations can be connected in parallel, facilitating multi-terminal connections.

In contrast, the conventional line commutated converter stations are "current devices". When power through the stations is varied, it is the DC link voltage which is varied. Thus, their DC link terminals cannot be connected directly in parallel. As "current devices", they favour series connections. Multi-terminal connections in parallel require buffer inductances between stations. Power reversal in such multi-terminal connection is not permitted.

In radial or multi-terminal connections of the PWM converters, each converter has simple local control.

BRIEF DESCRIPTION OF THE DRAWINGS

FIG. 1 is a block diagram of a semiconductor switch with gate turn-off capability;

FIG. 2 is a block diagram of a single-phase PWM converter station, in accordance with the invention;

FIG. 3a, 3b, 4a and 4b are diagrams of the current amplitude with respect to time in the PWM converter of FIG. 2, for various operating conditions of the converter;

FIG. 5b is based on three single-phase bridges as illustrated in FIG. 2 based on FIG. 5a;

FIG. 6a, 6b and 6c are waveform patterns the converter of FIG. 5b;

FIG. 7a and 7b are diagrams of a signal regulating the switching state of the valves of the converter shown in FIG. 5b;

FIG. 8 is a simplified Thevenin voltage diagram representing the utility power system and the PWM converter, according to the invention;

FIG. 9a and 9b are diagrams of the angular frequency and the voltage angle with respect to time illustrating the direct and the indirect voltage angle control, in accordance with the invention.

FIG. 11a is a block diagram of a voltage controlled oscillator circuit for frequency control in a PWM converter station;

FIG. 11b is a diagram of the frequency with respect to the input voltage of the voltage controlled oscillator shown in FIG. 11a;

FIG. 12 is a diagram of a counter circuit for use in voltage angle control;

FIG. 13a is a block diagram of an analog-to-digital converter for use in direct voltage angle control;

FIG. 13b is a table of the binary output of the analog-to-digital converter of FIG. 13a;

FIG. 13c is a diagram of a gating circuit for controlling the analog-to-digital converter of FIG. 13a;

FIG. 13d illustrates the waveform pattern of the gating circuit of FIG. 13c;

FIG. 27a is a diagram of a PWM converter station with capacitor and inductor banks that can be switched in quantized units by a logic control system;

FIG. 27b is a diagram showing a VAR waveform with respect to time in a PVM converter;

FIG. 28 is a typical schematic diagram of a field excitation system of a synchronous generator;

FIG. 29 is a diagram of a PWM converter with a supplementary control system for stability and dynamic enhancement;

FIG. 30 is a diagram of a multi-terminal HVDC connection;

FIG. 31 is a diagram of a radial HVDC long distance DC transmission line using PWM converters;

FIG. 32 is a diagram of a radial back-to-back DC link using PWM converters; and

FIG. 33 is a diagram of a PWM converter station with complete controls.

DESCRIPTION OF PREFERRED EMBODIMENTS

Figure 5A:
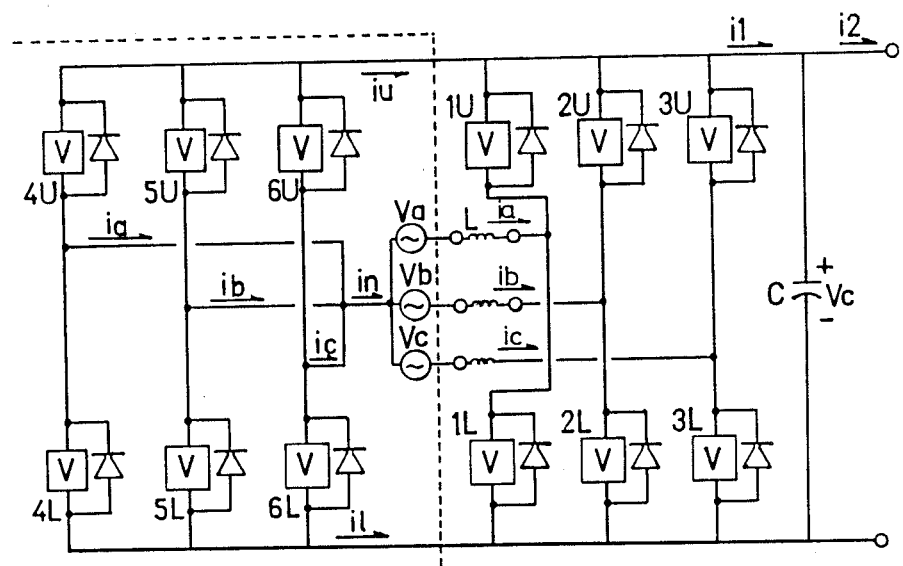
FIG. 5a is a complete diagram of a three-phase bridge converter.

To facilitate the understanding of the invention, the following description refers to some basic principles. The description is organized under the following sections:

| Section | Title |
| --- | --- |
| 1 | Valve; |
| 2 | Boost type PWM converter principles; |
| 3 | Implementation of the boost type PWM converter; |
| 4 | Multi-modules in series and parallel connection; |
| 5 | Boost type PWM converter stations; and |
| 6 | Systems of boost type PWM converter stations. |

The starting point is the electronically controlled power switch which is referred to as a "valve" in this patent application. This valve can be turned ON and turned OFF bvy a logic signal at the gate. Section 1 defines exactly the meaning of the term "valve" in this application and briefy describes its principal characteristics.

Section 2 summarizes the principle of bi-directional power transfer across a bridge converter and also summarizes the pulse width modulation principles. The intent of this section is to emphasize that although there are many ways of realizing the PWM principle, the end products are the same, namely:

(a) the fundamental Fourier harmonic component is enchanced while low harmonics are suppressed and the residual harmonic components are in the high frequency end of the spectrum;

(b) the amplitude of the fundamental Fourier harmonic component can be controlled directly;

(c) the frequency of the fundamental Fourier harmonic component can be controlled directly;

(d) the phase angle of the fundamental Fourier harmonic component can be controlled directly.

When the valves of the bridge converter are turned ON and OFF in accordance to the PWM principles, not only the end products can be realized but the bi-directional power handling capability also becomes a feature of the converter. The chief attraction of this topology is that the DC link voltage is undirectional and bi-directional power transfer involves bi-directional DC link current flow.

Section 3 describes an examples of a control system in a PWM converter, in which the fundamental Fourier harmonic component of the voltage at the 3-phase AC terminals of the PWM converter responds to input signals controlling:

(1) the voltage amplitude;
(2) the voltage frequency; and
(3) the voltage phase angle.

Section 4 is concerned with reaching very high voltages and very high current ratings expected of a HVDC station. The example described in Section 4 is based on connecting a plurality of PWM converter modules in series and in parallel. By staggering the switching instants of the modules, the appearance of fast switching rates is achieved so that a very high quality voltage waveform is realized. This is despite of the fact that the valves in each module are switching at a low rate. This has the advantage that relatively slow valves can be used. Another advantage is that switching losses are reduced as the switching rate of the individual valves is reduced.

Section 5 is concerned with a PWM converter capable of handling megawatts and megavars. The converter has 3 inputs: (1) AC voltage amplitude control (2) AC voltage frequency control and (3) AC voltage phase angle control.

By using the frequency control and the phase angle control in a voltage lock loop, the PWM converter can be synchronized and can remain synchronized to the AC utility in spite of frequency and voltage angle drifts in the utilites.

The PWM converter can be configured into one of the two basic building blocks:

(1) Power Dispatcher; and
(2) Master DC Voltage Regulator.

As a power dispatcher, the converter maintains a constant deliverly of the power (rectifier or inverter power) assigned to it.

The master DC voltage regulator maintains the DC voltage assigned to it. It is basically a power slack which assures that the algebraic sum of the power into the DC system is equal to the ohmic losses in the DC transmission lines.

Each converter, be it a power dispatcher or master DC voltage regulator, maintains a regulated voltage at the AC terminals thereof. The AC voltage can be raised or lowered by the amplitude control to vary the reactive power intake.

Each converter is capable of handling leading or lagging VAR's. For economic reasons, switched capacitors and/or switch inductors may be used. There is no need of static VAR controllers as the continuous control of VAR's between the quantum jumps between capacitor/inductor switchings can be handled by the station itself.

The three inputs: (1) amplitude, (2) frequency and (3) voltage phase angle are levers by which supplementary controls for stability and dynamic performance can be incorporated.

Section 6 considers two or several AC systems integrated through a single DC network, based on parallel connection of PWM converters. One station is the master DC voltage regulator in order to assure the existance of the DC network voltage. The power dispatchers fulfill their assignments with local controls. As a power slack, the master DC voltage regulator makes up for the power balance. The control is extremely simple and does not need telecommunication channels nor reversing switches.

1. VALVE

The PWM converter, according to this invention, is based on the electronically controlled, electric power switch designated hereinafter as "valve" and which is represented by the black-box symbol in FIG. 1.

The electric power switch terminals are A and K. The path of unidirectional current flow is from terminal A to K. The valve has an ON-state and an OFF-state.

The valve is turned ON by applying an electronic signal to a terminal of the device. It can also be turned OFF by applying a signal to the same or another terminal specifically provided at this end. The valve shown in FIG. 1, has only one gate terminal G used to turn the valve ON and OFF, however, this designation is intended to encompass a valve with independant ON and OFF gate terminals.

When triggered ON, the resistance between A and K is low. When current passes from A to K, the voltage drop between A and K is low. When triggered OFF, the resistance between A and K is high. Even when a very large positive voltage is applied from A to K, the current which can flow from A to K is very low. At all times when a reverse voltage is applied (K having a positive polarity with respect to A), the valve blocks, that is at most a very small leakage current flows from K to A. Presently, based on silicon technology, examples of such a valve are in gate-turn off thyristor (GTO), and gate-turn off devices such as power bipolar transistors, power metal oxyde semiconductor field effect transistor (MOSFET), etc. The force-commutated thyristor, where an auxiliary thyristor in conjuction with a resonant LC circuit, is also considered to come under the definition of valve.

With the changing of technology, the detail implementation of the amplifying circuitry which steps up the trigger levels (micro watts) at the gate to the power levels to effect a successful transition from the OFF state to the ON state (or vice versa), will also change. Likewise each device has its individual characteristics requiring its special di/dt, dv/dt protections, snubbers, energy recovery circuits to reduce switching losses.

The valve, as defined here, also covers the gate drive circuits and the auxiliary circuits for di/dt, dv/dt protection, snubbers, energy recovery circuits to reduce switching losses. It covers also the series diodes which may be added to increase the reverse voltage blocking capability.

The term valve also covers the logic interlock circuits which prevent malfunction through poor coordination. For example, in the single-phase boost type PWM converter of FIG. 2, a "shoot through" fault occurs when the upper valve and the lower valve in the branch are simultaneously ON. The DC link terminals are short-circuited, causing dangerously large currents to flow through the two simultaneously ON valves. The inter-lock circuit ensures that both valves in the same branch are never simultaneously ON. One method of ensuring this is to introduce a time delay between the turning OFF of one valve in the branch before the other valve is turned ON.

Finally, the designation of valve covers the series and/or the parallel connections of several, closely matched, nearly identical electronically controlled, electric power switches. The series connection is for the purpose of increasing the voltage rating. The string of series connected devices is between the terminals A and K of FIG. 1 and they are turned ON and OFF in unison by electronic trigger signal at the gate terminal G. There will be auxiliary circuits to ensure that the voltage is shared almost equally by each device, during steady-state and transient conditions.

The parallel connection is for the purpose of increasing the current rating. The devices connected in parallel are situated between A and K of FIG. 1 and they are turned ON and OFF in unison by electronic trigger signal at the gate terminal G. There will be auxiliary circuits to ensure that the current is shared almost equally by each device, during steady-state and transient conditions.

In the practical world, the electronically controlled, electric power switches can never be turned ON or OFF simultaneously. By unison, it is meant here that the delays between the switches in the transistions from ON and OFF state and vice versa, are so minute as not to affect adversely the proper functioning of the series and/or parallel connection of the switches, which are operated as a single unit, namely the valve.

2. BOOST TYPE PWM CONVERTER

The operation of the boost type PWM converter is best explained in the context of the single-phase case as shown in FIG. 2. In FIG. 2, the valves V1U, V4L operate as one pair and V4U, V1L operate together as the one pair. When one pair is ON, the other pair OFF and vice versa.

2.1.1 Single Phase Bridge and Boost Principle

The distinguishing features of the boost type converters as illustrated in FIG. 2 are:
 (a) an inductance L is on the AC side;
 (b) a capacitance C is on the DC link side;
 (c) the direction of current flow through the four valves, (V1U, V1L, V4U and V4) is from the positive bus to the negative bus of the DC link; and
 (d) the direction of current flow through the four antiparallel diodes (D1U, D1L, D4U and D4L) is from the negative bus to the positive bus of the DC link.

For the proper operation of the converter, at all times, the DC link voltage $V_c$ is higher than the maximum amplitude of the voltage $V_a$ on the Ac side. The ensures that the anti-parallel diodes are normally reverse-biased. The conduction of the diodes is only possible with the help of the Ldi/dt voltage of the inductance L. It is assumed here that the required $V_c$ is available through an external DC voltage source.

To understand the operation of the converter, it is necessary only to discuss 4 cases: Rectifier Operation $i_2 > 0$ for $i_a > 0$ and $i_a < 0$, and Inverter Operation $i_2 < 0$, for $i_a > 0$ and $i_a < 0$.

It should be noted that the four cases cover exhaustively all conceivable operating conditions. The DC link voltage $V_c$ is unidirectional. However, the AC voltage $V_a$ can be either positive or negative, the only constraint being that the peak value must be less than $V_c$. The AC attribute is covered by the possibility that $i_a$ is treated for the positive case and the negative case. In both possibilities of $i_a$, it is shown that a rectifier operation $i_2 > 0$ and an inverter operation $i_2 < 0$ are possible.

Rectifier Operation $i_2 > 0$ for $i_a > 0$

Initially, V1L and V4U are turned ON. The voltage across the inductance L is $V_c + V_a$ and since it is a positive voltage, the current $i_a$ increases, thus building up storage magnetic energy in L. As soon as V1L and V4U are turned OFF, the current $i_a$ finds a path through D1U and D4L. The diode conducts with the help of the $Ldi_a/dt$ voltage associated with the falling current. The cycle repeats when V1L and V4U are turned ON again.

In this brief cycle, there are two time segments, $\Delta t_1$ when the valves V1L and V4U are ON and $\Delta t_2$ when they are OFF. In this cycle $i_a$ and $i_1$ change in time as shown in FIG. 3(a). When $\Delta t_2 > \Delta t_1$ so that the time integral of the DC link current $i_1$ is positive, the converter is rectifying. The instantaneous DC current $i_1$ flows in the negative direction during $\Delta t_1$ and in the positive direction during $\Delta t_2$. The DC link capacitor C acts as a buffer, as the voltage across it is discharged during $\Delta t_1$ and charged during $\Delta t_2$. The load current $i_2$ is unidirectional and positive when the capacitor C is large enough to filter out the pulsations.

for $i_a < 0$

Initially, V1U and V4L are turned ON. The voltage across the inductance is $-(V_c - V_a)$. Since $i_a$ is negative and the applied voltage is negative (because $V_c > V_a$), the negative current continues to grow in the negative direction during the period $\Delta t_1$, as shown in FIG. 3(b).

When V1U and V4L are turned off, during the time segment $\Delta t_2$, the current $i_a$ finds a path through the diodes D4U and D1L. The diodes are made to conduct because of the $Ldi_a/dt$ voltage is equal and opposite to $(V_c - V_a)$. The current $i_1$ on the DC link side is shown in FIG. 3(b). When the time interval $\Delta t_2$ is made greater than $\Delta t_1$, one sees that in the period $\Delta i_1 + \Delta t_2$, the average DC link current is positive showing that rectification is taking place. The capacitor in the DC link acts as a filter and when the period $\Delta t_1 + \Delta t_2$ is small and the capacitor is large, the output current $i_2$ is unidirectional and positive.

Inverter Operation $i_2 < 0$

The average current in the DC link is determined by the area enclosed by $i_1$ in the time span $(\Delta t_1 + \Delta t_2)$ and averaged over this time span. One sees that by making $\Delta t_1 > \Delta t_2$, the net current flow is negative (from the DC link side to the AC side). This corresponds to inverter operation.

for $i_a > 0$

The switching of the valves is identical to the rectifier operation, the current flowing through V1L, V4U or D1U, D4L, except that $\Delta t_1$ is longer than $\Delta t_2$. FIG. 4(a) shows that $i_a$ and $i_1$ have the same pattern as in FIG. 3(a). From the area enclosed by $i_1$, it is easy to see that because $\Delta t_1 > \Delta t_2$, the average DC link current is negative.

For $i_a < 0$

The current path is through V1U, V4L or D1L, D4U. From FIG. 4(b), one sees how the average DC link current $i_1$ is negative when the current $i_a$ is negative. The switching of the valves is identical to rectifier operation so that the currents patterns of FIG. 4(b) are identical to FIG. 3(b) except for the fact that $\Delta t_1 > \Delta t_2$.

2.1.2 Boost Principle and PWM

In FIG. 3 and 4, it is shown that the DC link current $i_1$ consists of a negative current pulse in $\Delta t_1$ and a positive pulse in $\Delta t_2$ and the rectification or inverter operation depends on their relative durations in the ON-OFF time cycle $\Delta t_1 + \Delta t_2$.

The PWM techniques consist of applying successive ON-OFF cycles involving $(\Delta t_1 + \Delta t_2)$ of FIG. 3 and 4. The durations $\Delta t_1$ and $\Delta t_2$ in each cycle are modulated so as to produce voltage or current waveforms of certain specifications. While fulfilling the specified objectives, the boost type topology of FIG. 2 enables a bi-directional power transfer.

2.2 Three Phase Bridge

The 3-phase bridge can be thought of as three sets of the single phase bridge of FIG. 2 connected together as shown in FIG. 5(a). The valves and anti-diodes forming each phase are:

a-phase: 1U, 1L, 4U, 4L
b-phase: 2U, 2L, 5U, 5L
c-phase: 3U, 3L, 6U, 6L

The current $i_n$ in the neutral link is $i_n = i_a + i_b + i_c$. Also from continuity of current $i_n + i_u + i_l = 0$ where $i_u$ and $i_l$ are the currents of the upper and the lower rails as defined in FIG. 5(a). For operations under a condition when $i_a + i_b + i_c = 0$, the neutral current $i_n = 0$ and $i_u + i_l = 0$. This implies that the valves and anti-diodes 4U, 4L, 5U, 5L, 6U and 6L can be removed, leaving the 3-phase bridge of FIG. 5(b).

It should be noted that FIG. 5(a) is intended only for exemplary purposes. In fact, when the three-phase bridge of FIG. 5(b) is made to operate in the open neutral wye connection, a slight complication arises because the neutral voltage has 4 possible voltage levels $$(0, \pm V_c/3, \pm 2V_c/3 \text{ and } \pm V_c)$$

depending on the $2^3 = 8$ possible switching states of the valves in the three branches. The slight complication does not nullify the usefulness of FIG. 5(a) as an aid understanding the three-phase bridge of FIG. 5(b).

Figure 5B:
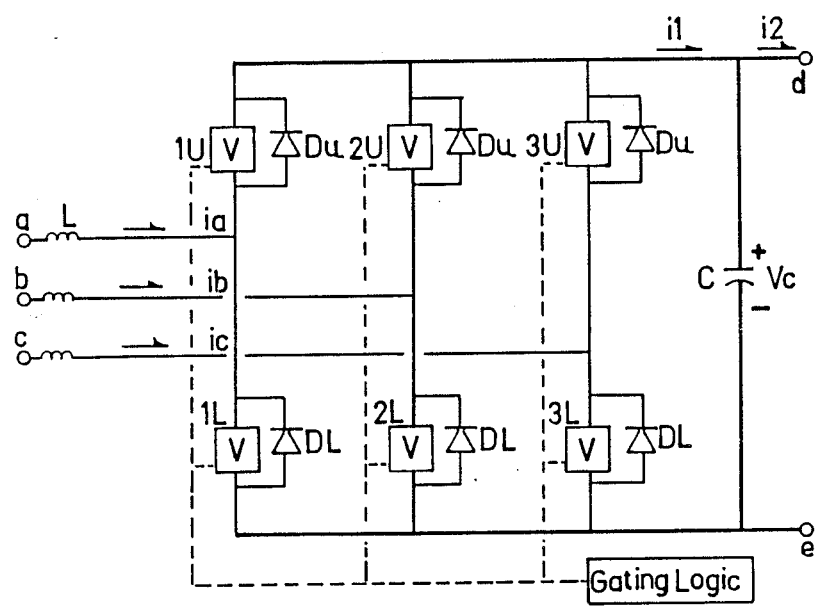

The points to stress here are that the three-phase bridge of FIG. 5(b) is of the boost type with the following features: (1) the inductance L is on the AC side of each phase, (2) the capacitor is on the DC side, (3) the DC link voltage is unidirectional, the terminal d is positive with respect to e, (4) the direction of current flow through the valves are from the bus of terminal d to the bus of terminal e, (5) the direction of current flow through the antiparallel diodes are from the bus of terminal e to the bus of terminal d. As the AC terminals a, b, and c are connected to a three phase balanced wye connected AC supply and the valves are triggered ON and OFF in accordance to one of the 3-phase PWM strategies, the boost type topology automatically looks after the bi-directional power flow by maintaining unidirectional voltage in the DC link and bi-directional DC current flow. All the other benefits of the PWM strategies are retained.

2.3 Pulse Width Modulation Principles

2.3.1 Single Phase Converter

Using the single-phase boost type converter of FIG. 2 as an example, one sees that by switching the valve pair (V1U, V4L) and its complement valve pair (V1L, V4U) ON and OFF repeatedly in a cyclical pattern with the period $0<\theta<2\pi$, as shown in FIG. 6(a), the voltage $V_{kh}$ between the terminals K and H is of the form as shown in FIG. 6(b). In this illustrative example, within the period $0<\theta<2\pi$, there are ten switching instant at $$\alpha_1, \alpha_2, \ldots \alpha_{10}$$

The voltage $kh(\theta)$ can be expressed as Fourier Series.

$$V_{kh}(\theta) = 0.5 \ C_o + \sum_{m=1}^{\infty} C_m \sin(m\theta + \theta_m)$$

$$\text{where } C_o = \frac{1}{\pi} \int_o^{2\pi} V_{kh}(\theta) d\theta$$

$$C_m = [a_m^2 + b_m^2]$$

$$\theta_m = \arctan\left(\frac{b_m}{a_m}\right)$$

$$a_m = \frac{1}{\pi} \int_o^{2\pi} V_{kh}(\theta) \cos m\theta d\theta''$$

$$b_m = \frac{1}{\pi} \int_o^{2\pi} V_{kh}(\theta) \sin m\theta d\theta''$$

In general, the switching instants are not limited to ten as used in the illustrative example. For JMAX switching instants $\alpha_1, \alpha_2, \ldots \alpha_{jmax}$, there are JMAX degrees of freedom for controlling the Fourier coefficients, which are transcendental functions of $\alpha_1, \alpha_2, \ldots \alpha_{jmax}$.

$$C_m = g_m(\alpha_1, \alpha_2, \ldots \alpha_{jmax})$$

Note that there are an infinite number of Fourier harmonics so that the JMAX (finite number) degrees of freedom are insufficient to suppress all the harmonics. At best, a number of low harmonic components can have $C_m = 0$. One degree of freedom must be available to control the amplitude $C_1$ of the fundamental component. The remaining degrees of freedom may be used to reduce the overall harmonic content. Fourier harmonics which are not suppressed are tolerable in the high frequency end of the spectrum where the filters for them are relatively cheap to implement.

2.3.2 Sinusoidal PWM (SPWM)

In sinusoidal PWM, the switching angles $\alpha_1, \alpha_2, \ldots \alpha_{jmax}$ are determined by the intersection points of the carrier wave and the modulating wave as shown in FIG. 7. The carrier wave consists of integral multiples of isosceles triangles fitted into the basic period of the modulating wave. The modulating wave is a sine wave of the fundamental period $0<\theta<2\pi$. The amplitude of $C_1$, the fundamental Fourier harmonic component of FIG. 6(b) varies directly with the amplitude of the modulating wave in FIG. 7.

The implementation of SPWM may be analog orientated or digital orientated.

Analog Orientated Implementation consists of real time analog circuits which generate the triangular carrier wave and the basic sinusoidal modulating waveform. The intersection points are detected and are used to activate the gating logic shown in FIG. 2 and 5. The amplitude control, $V_{modc}$, of the modulating waveform is multiplied with the basic sine-wave.

Digital Orientated Implementation

The triangular carrier wave and the basic modulating sine wave are uniformly sampled in the period $0<\theta<2\pi$. The sampled points are stored digitally in two look-up tables. The look-up tables are addressed by binary numbers $n_s$, $n_3 = 0,1,2, \ldots, (N_s-1)$ with the look-up tables containing the values of the triangular wave, $V_T(n_s 2\pi/N_s)$, and the basic sine wave, $\sin(n_s 2\pi/N_s)$. By using a counter (modulo $N_s$) to scan the addresses, and by comparing the output of the triangular look-up table with the product of the amplitude control with the basic sine wave, the switching angles $\alpha_1, \alpha_2, \ldots \alpha_{jmax}$ can be determined in real time to activate the gating logic of FIG. 2 and FIG. 5.

Before concluding this section, it may be added that there are minor variants to the method. For example, the modulating wave may be a square or a trapezoidal wave. The fundamental Fourier coefficient $C_1$ can be controlled linearly in a limited range by varying the amplitude of the modulating wave.

2.3.3 Harmonic Elimination Principle

The harmonic elimination method is usually implemented with a microcomputer with the help of a look-up table containing the switching angles $\alpha_1, \alpha_2, \ldots \alpha_{jmax}$ corresponding to the desired amplitude of the fundamental harmonic voltage $C_1$. The contents of the look-up table have been determined previously with the help of a main-frame computer which solves numerically for the angles $\alpha_1, \alpha_2, \ldots \alpha_{jmax}$ required to output the desired voltage $C_1$ while satisfying the constraint that the Fourier harmonic coefficients of low harmonic order are zero, that is $$C_m = g_m(\alpha_1, \alpha_2, \ldots \alpha_{jmax}) = 0$$

for some selected values of m.

On solving the nonlinear transcendental simultaneous equations, one has the switching angles evaluated as functions of $C_1$ that is:

$$\alpha_1(C_1), \alpha_2(C_1) \ldots \alpha_{jmax}(C_1)$$

which are stored in the look-up tables.

From a command for a particular value of $C_1$, the angles are retrieved from the look-up table and the pulse widths are generated in real time with the help of down counters.

2.3.4 Three Phase Converter

In the single phase converter of FIG. 2, the PWM control consists of sending gate logic signal to valve V1U as illustrated by FIG. 6(a). The logic signal to V1L is the complement to the logic signal sent to V1U. The switching angles $\alpha_1, \alpha_2 \ldots \alpha_{jmax}$ are determined by the SPWM strategy discussed in Section 2.3.2 or the harmonic elimination strategy discussed in section 2.3.3.

In the three-phase implementation of the converter of FIG. 5(b), the gate logic signals to drive the valves V2U and V2L of the B-phase and the valves V3U and V3L of the C-phase are each generated in the same way as the A-phase except for an angle delay of $-2\pi/3$ and $-4\pi/3$ for the B- and C-phase respectively. Describing the logic state of V1U of FIG. 6(a) as V1U ($\theta$), then the logic state of the valve V2U of the B-phase is V2U($\theta$)=V1U($\theta-2\pi/3$) and the logic state of V3U of the C-phase is V3U($\theta$)=V1U ($\theta-4\pi/3$).

2.4 Voltage Amplitude Control

Using any one of the PWM principles described in Section 2.3, there is a controllable range in which the fundamental harmonic component of voltage $C_1$ is linearly dependent of an input signal $V_{modc}$.

As the low order harmonics are suppressed by the PWM techniques and the high harmonics can be removed by economical filters, only the fundamental harmonic component of voltage will continue to be the subject in the discussion.

The point to emphasize is that the phase-to-neutral voltages of three phases are: $C_1\sin(\theta-\phi_1)$, $C_1\sin(\theta-\phi_1-2\pi/3)$ and $C_1\sin(\theta-\phi_1-4\pi/3)$ where $C_1$ is proportional to an amplitude control signal $V_{modc}$.

2.5 Frequency Control

Irrespective of whether the method is by SPWM or by harmonic elimination principle, the PWM strategies are based on locating the switching angles $\alpha_1, \alpha_2 \ldots \alpha_{jmax}$ in the basic period $0 < \theta < 2\pi$. This period can be cycled through at a fast or slow rate without affecting the linear relationship of $C_1$ with the amplitude control $V_{modc}$. Thus amplitude control and frequency control are independent of each other.

By definition, the angle $\theta$ is related to the angular frequency control by the following relationship.

$$\frac{d\theta}{dt} = w_c$$

$$\theta = \int_{-\infty}^{t} W_c dt$$

For constant frequency control, the A-phase voltage is $C_1\sin(\omega_c t - \phi_1)$.

A convenient implementation of the frequency controller is through the use of the VCO (Voltage Controller Oscillator). In one form of the VCO, the output is a square wave whose frequency is proportional to the voltage applied to its input. Thus the frequency command $\omega_c$ is inputted as a voltage to the VCO and the count of the square wave output is used as a measure of $\theta$.

2.6 Voltage Angle Control

As a major aspect of this invention is the voltage angle control, this section is devoted to clarifying its exact meaning. Considering one phase of the PWM boost type converter represented as an ideal voltage source in FIG. 8, the fundamental harmonic voltage is expressed mathematically as $C_1\sin(\omega_c t - \phi_c)$. Let us consider the corresponding phase of the utility power supply to which it will be synchronized. The equivalent Thevenin voltage is $V_s\sin(\omega_s t - \phi_s)$ as shown in FIG. 8. The power supply frequency $\omega_s$ drifts slightly over a long time period but for our discussion, it is assumed constant. For synchronization to be possible the converter frequency $\omega_c$ must be made equal to the utility frequency $\omega_s$.

The voltage angle in question is defined as $(\theta_s - \theta_c)$ where $\theta_c = \omega_c t - \phi_c$ and $\theta_s = \omega_s t - \phi_s$. The voltage angle control can be direct or indirect.

FIG. 9 display the $\omega$-vs-time and the $\theta$-vs-time curves to emphasize that the voltage angle is the time integral of the angular frequency. As such it is possible to control the voltage angle indirectly by jogging the frequency control forward or backward.

Direct voltage angle control by-passes the frequency control altogether. This is illustrated in FIG. 9(a).

2.6.1 Indirect Voltage Angle Control by Integrating Frequency

FIG. 9(b) shows the case where initially $\omega_s = \omega_c$ $\theta_s = \theta_c$. In order to advance the voltage angle of $\theta_c$, $\omega_c$ is increased momentarily. The voltage angle advance is kept constant when $\omega_c = \omega_s$. The angle can be retarded by decreasing $\omega_c$.

The input voltage $V_c$ to the VCO controls its counting rate and effectively the time base.

3. IMPLEMENTATION OF BOOST TYPE PWM CONVERTER

Figure 10:
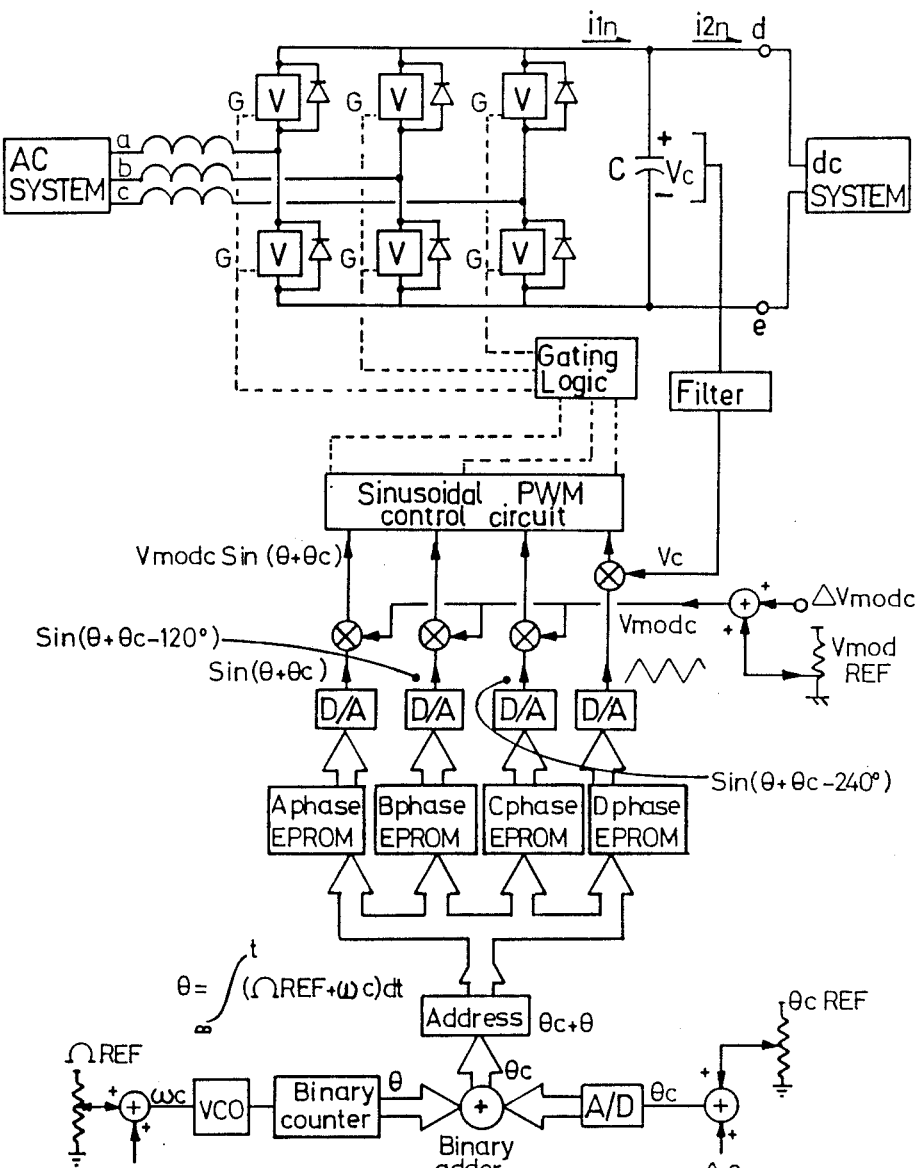
FIG. 10 is a block diagram of a control system for regulating the switching of the valves of a three phase PWM converter, in accordance with the invention.

FIG. 10 shows in a block-diagram form, the implementation of the controls of the basic boost type converter bridge module of FIG. 5(b).

The sinusoidal PWM (SPWM) principle is used in this implementation. This consists of generating a triangular carrier and three basic sine-wave modulating signals for each of the three phases. The switching angles are based on the intersection of the carrier waveform and the modulating waveforms. The block labeled "sinusoidal PWM control circuit" accepts as inputs the modulating signals of each of the three phases and the triangular carrier signal and outputs the timing signals to the gating logic of the valves. The implementation of this function is well known and will not be discussed further.

The key issues consists of the implementation of the three control functions so that the phase to neutral voltages of terminals a, b and c have fundamental harmonic components of the form: $C_1\sin(\omega_t + \phi_1)$, $C_1\sin(\omega_t + \phi_1 - 120°)$ and $C_1\sin(\omega_t + \phi_1 - 240°)$.

The three control functions are:
 (1) $V_{modc}$ which controls the voltage amplitude $C_1$;
 (2) $\omega_c$ which controls the voltage angular frequency $\omega$; and
 (3) $\theta_c$ which controls the voltage phase angle $\phi_1$.

As shown in FIG. 10, each of these control functions is in the form of an analog signal, obtained over an adjustable range using a potentiometer as a voltage divider. The reference settings for the voltage amplitude, frequency and voltage angle are respectively $\Omega_{REF}$, $V_{modREF}$ and $\theta_{REF}$. Electronic adders are provided so that feedback signals of the voltage amplitude $\Delta V_{modc}$ frequency $\Delta\omega_c$ and voltage angle $\Delta\theta_c$ can be included so that $$V_{modc}=V_{modREF}+\Delta V_{modc}$$

$$\omega_c=\Omega_{REF}+\Delta\omega_c$$

$$\theta_c=\theta_{REF}+\Delta\theta_c$$

As shown in FIG. 10, the input $\omega_c$ which is an analog voltage, controls the frequency of the pulsed output of the voltage controlled oscillator (VCO). The VCO output pulses are counted by a binary counter. The counting of the pulses corresponds to the time integration of the frequency of $\omega_c$. The contents of the binary counter is therefore a measure (in binary digits) of the voltage angle $\theta$. When the pulse rate is high, the voltage angle $\theta$ increases at a high rate (the rate being the frequency). It should be noted that the binary counter has a finite number of bits and when the count reaches 111 ... 111, the next count resets it to 000 ... 000.

The cyclical property fits exactly the voltage angle measure desired of the system. This is because in the harmonic functions, the basic repetition period is $0 < \theta < 2\pi$ and in the binary counter the repetition period is 000 ... 000 to 111 ... 111. Each binary number in the counter is a discretized representation of the angle $\theta$. Since the angle is kept increasing by the VCO, it is indirectly controlled by the frequency input, $\omega_c$.

Using a digital adder, one can add one binary number to another binary number in real time. This enables *direct voltage angle* control to be implemented. As shown in FIG. 10, the direct angle control $\theta_c=\theta_{ref}\Delta\theta_c$ is orginally an analog signal. It is converted by an A/D (analog-to-digital) converter to a binary digital number.

Using a binary adder, the binary number representing $\theta_c$ is added to the contents of the binary counter. As the VCO keeps pulsing, the binary counter keeps increasing. The voltage angle $\theta_c$ which is introduced by the binary adder is the angle shift with respect to the angle represented by the content in the binary counter.

As shown in FIG. 10, the output of the binary adder is used as the binary address of four look-up tables which are implemented by EPROM's. As the look-up tables are addressed, their contents in the address which are in binary form, are converted by D/A (digital-to-analog) converters with sample and hold features.

The contents of the look-up tables depend on the PWM strategy which is employed. In the sinusoidal PWM strategy which has been adopted, as the VCO continues to pulse, the analog outputs of the D/A of the A-phase EPROM, the B-phase EPROM and C-phase EPROM are the discretized form of $\sin\theta$, $\sin(\theta-120°)$ and $\sin(\theta-240°)$. The output of the carrier EPROM consists of the discretized form of the triangular carrier.

Voltage amplitude control is accomplished by electronically multiplying the three basic sine-waves outputs by the D/A of the EPROMs by the control signal $V_{modc}=V_{modREF}+\Delta V_{modc}$.

The triangular carrier signal is electronically multiplied by a signal which is proportional to the DC link voltage $V_c$. This ensures that the amplitude of the AC voltage is independent of variations in $V_c$.

Within the block labelled "sinusoidal PWM control circuit", the information from the A-phase modulating signal and the triangular carrier signal are used to generate the gating logic signals to switch the valves of the A-phase in the three-phase bridge. The switching angles are based on the intersections of the modulating waveform and the carrier waveform.

The same principle is used for the B-phase and the C-phase.

3.1 Frequency Control

FIG. 11(a) shows the control circuitry to a voltage controlled oscillator VCO. As shown in FIG. 11(b) the frequency of the pulse output of the VCO is linearly proportional to the input voltage. In this embodiment for a utility frequency of 60 Hz, an output frequency of $\Omega REF=60\times2^{12}=245,760$ Hz has been selected. This frequency is obtained at an input voltage $V_{invco}=\frac{1}{2}V_{DD}$ specified by the manufacturer of the VCO(CD4046).

The input voltage is obtained from a potentiometer where the voltage of the frequency setting $\Omega REF$ can be adjusted. The operational amplifier LM 747 of FIG. 11(a) serves as part of an adder so that the voltage corresponding to the feedback signal $\Delta\omega_c$ can be added so that the frequency request of the VCO is $\omega_c=(\Omega REF+\Delta\omega_c)$.

3.2 Frequency Track by Feedback

Note that because of drifts in the voltage of the power supplies, in the amplifier gains and in the circuit components, the desired frequency $\Omega REF$ does not remain constant. In actual fact $\Omega REF$ should be in synchronism with the frequency of the utility system to which the converter is to be connected. The frequency of the converter does drift to a certain extent and the voltage angle changes with the power loading. The terminal $\Delta\omega_c$ allows a negative feedback loop to be formed to ensure that the converter frequency is always synchronized with the utility system in spite of the drifts.

As will be seen in section 5.4 and 5.5, the frequency feedback is strengthened by the voltage angle lock loop.

3.3.1 Voltage Angle Indirectly Controlled by a VCO

FIG. 12 shows three 4-bit binary counters which are incremented by the pulsed output of the VCO. When the VCO frequency is $\Omega REF=245,760$ Hz, the frequency of the highest bit is fC11=60 Hz. The 9 high bits of the counter (C3~C11) are used to control the EPROM adresses. As $2^9=512$, this means that the basic period $0<\theta<2\pi$ in FIG. 6 is discretized into 512 intervals and each interval is identified by a binary number. As the VCO keeps pulsing and the counter keeps increasing (modulo=512), the angle axis is being scanned repeatedly from $\theta=0$ to $\theta=2\pi$. The pulsing rate of the VCO determines the frequency of the scan.

3.3.2 Direct Voltage Angle Control using a Digital Adder

As shown in FIG. 10, the analogue signal $\theta_c$, which shifts the voltage angle directly, consists of a reference setting $\theta_{cref}$ which is obtained through a voltage divider and a feedback signal $\Delta\theta_c$. The two analog signals are added by electronic adders.

Figure 14:
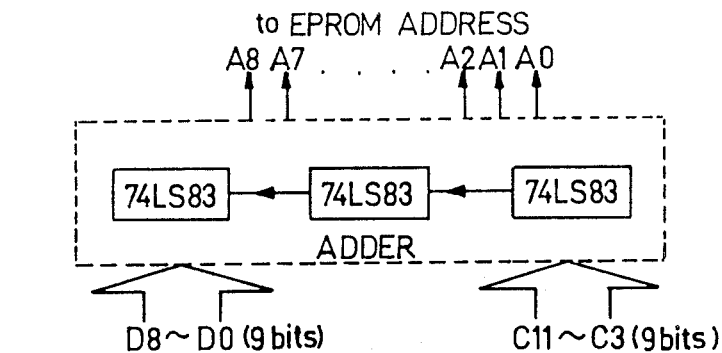
FIG. 14 is a diagram of a binary adder for voltage angle control in a PWM converter, in accordance with the invention.

The details of implementing the direct voltage angle control are described in FIG. 13 and 14. There are two parts: (1) A/D conversion of $\theta_c$ and (2) binary digit addition.

3.3.3 A/D Conversion of $\theta_c$

As shown in FIG. 13(a), the input $\theta_c$ is converted by an A/D converter (ADC 0804) into a 9 bit binary number (D8~D0).

FIG. 13(b) shows the conversion of the analog values of $\theta_c$ from 0 to 2.5 V into digital form. The analog voltage 2.5 V represents $\theta_c=0$, 0 V represents $-90°$ and 5 V represents $+90°$. The discretion level is 5 V/256=0.0195 mV per bit. Each bit increment represents 0.703°.

FIG. 13(c) shows the output lines of the counter C2, C3, C4 and C5 being combined in logic circuits to control the latch, the WR and the RD terminals of the A/D converter.

FIG. 13(d) shows the timing diagram.

3.3.4 Binary Addition

The control signal $\theta_c$ expressed in the digital form in lines D8~D0 are added to the contents of the binary counter C11~C3 using the binary adder shown in FIG. 14. The sum which is expressed as a binary number in the output lines A8~A0 is used as the address of the EPROM's.

Returning the voltage angle axis of FIG. 6 and 7, the address in (A8~A0) corresponds to the angle $$\theta = \int_{-\infty}^{t} [\Omega REF(\tau) + \Delta W_c(\tau)] d\tau + \theta_c$$

where the time integral is contained in the counter in (C11~C3), while the direct angle control $\theta_c$ is contained in (D8~D0).

3.4 Digitized Waveforms in EPROM

The method of implementing the SPWM control has consisted of discretizing the period $0<\theta<2\pi$ of FIG. 7 into $N_s$ (512) sample points, so that the numbers $n_s=0,1,2...(N_s-1)$ corresponds to the interval $2\pi n_s/N_s < \theta < 2\pi(n_s+1)/N_s$. The numbers $n_s=0,1,2...(N_s-1)$ expressed in the binary form are used as addresses of four look-up tables. The addressing of $n_s$ is from the lines A8~A0 from the adder of FIG. 14. As the counter (C11~C3) keeps on increasing, the look-up tables are repeatedly scanned (with modulo $N_s$).

The look-up tables of the A, B and C phases contain in its $n_s$ address the information of the basic sinusoidal waveforms $\sin(2\pi n_s/N_s), \sin[(2\pi n_s/N_s)-2\pi/3]$ and $\sin[(2\pi n_s/N_s)-4\pi/3]$. The fourth look-up table contains the information of the triangular carrier waveform.

The look-up tables are implemented by EPROM's with the contents stored as bits.

As shown in FIG. 10, the four EPROM's are simultaneously addressed by the address register (A8~A0) and the binary information in the EPROM's are converted by D/A (digital-to-analog converters) to analog voltages which reconstruct the sinusoidal modulating waveforms and the triangular carrier waveform.

3.5 Voltage Amplitude Control

Using the Sinusoidal PWM strategy, the amplitude of the fundamental harmonic component has the formula:

$$C_1 = \frac{V_{modc} V_c}{V_T}$$

where $V_{modc}$=peak value of sinusoidal modulating waveform $V_t$=peak value of triangular carrier $V_c$=DC link voltage The voltage amplitude control is based on implementing the above formula.

As shown in FIG. 10 the voltage amplitude control $V_{modc}$ consists of two parts: (1) a voltage amplitude reference $V_{modREF}$ setting obtained from a voltage divider, (2) a feedback voltage $\Delta V_{modc}$. The two analog signals are added electronically so that $$V_{modc} = V_{mod\ REF} + \Delta V_{modc}$$

The voltage amplitude control signal is electronically multiplied to each of the basic sinusoidal waveform signals emerging from the D/A converters of the EPROM's of the A, B and C phases.

In order to ensure that $C_1$ is not affected by the changes in the DC link voltage $V_c$, the output waveform of the triangular carrier EPROM is multiplied by a signal which is proportional to $V_c$. This signal is obtained from a voltage transducer across the DC link and is passed through a filter which removes the residual switching ripples. Since the peak value of the triangular carrier $V_t$ is made proportional to $V_c$, the voltage amplitude $C_1$ is independent of $V_c$.

4. MULTI MODULES IN SERIES AND IN PARALLEL TO INCREASE THE VOLTAGE AND THE CURRENT RATINGS

In Section 1, it has been stated that the valve which is represented by the symbol of FIG. 1 may in fact consist of a number of series and/or parallel connected electronically controlled power switch devices (GTOsMCTs, power bipolar transistors, power MOSFETS, etc.) for the purpose of increasing the voltage withstand limit and the current carrying of the valve. Some electronically controlled power switch devices are not easy to connect in series and/or in parallel. The voltage and current stresses may not be easily distributed evenly among the devices. The devices may not switch ON and OFF simultaneously.

In the event that the series and/or parallel connections cannot be easily accomplished at the device level within the individual valve, the voltage rating and the current rating can be increased by connecting converter modules in series and in parallel.

4.1 Boost Type PWM Converter Module

Figure 15:
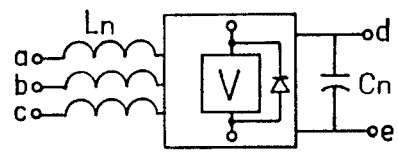
FIG. 15 illustrates the symbol used throughout the application to designate a PWM converter module.

FIG. 15 is the symbol of the PWM Boost Type Converter Module of FIG. 5(b).

4.2 Series connection

Figure 16A:
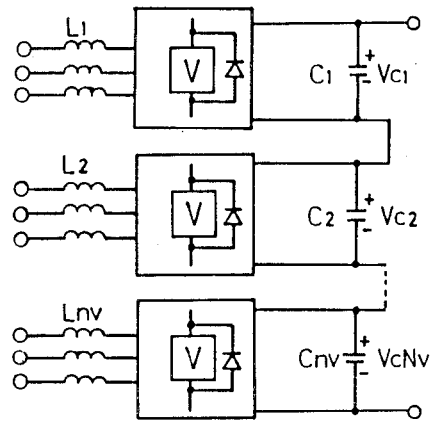
FIG. 16a is a diagram of a PWM converter station with a plurality of series connected PWM converter modules.

FIG. 16(a) shows $N_v$ modular units connected in series. The AC supply terminals have to "float" so that the DC link voltages can be added as $$VDCT = \sum_{n=1}^{N_v} v_{cn}$$

The voltage sharing across each module is determined by the tolerance of the circuit parameters $L_n$, $C_n$ and the AC supply voltage. The valves in the same phase do not have to switch simultaneously.

4.3 Parallel Connections

Figure 16B:
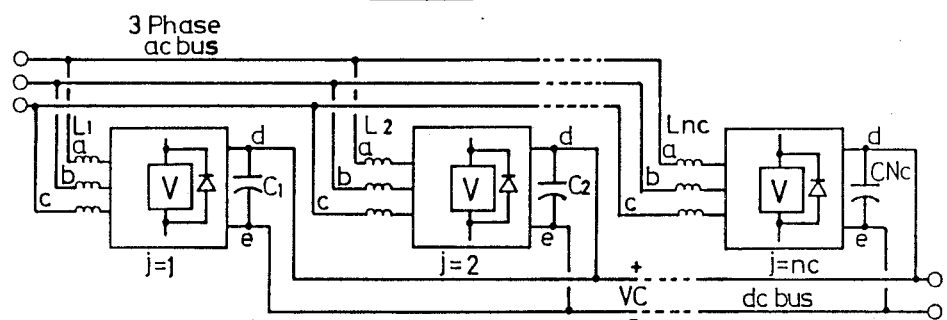
FIG. 16b is a block diagram of a PWM converter station with a plurality of parallel connected PWM converter modules.

FIG. 16(b) shows $N_c$ modular PWM converter units connected in parallel for the purpose of increasing the current carrying capability in both the AC side and the DC side. The DC output voltage is common to all the modules. The inductances $L1, L2, \ldots L_n, \ldots L_{nc}$ enable the modules to be connected to a common three-phase AC bus. When the inductances $L1, L2, \ldots L_{nc}$ are manufactured to close tolerances, the current is shared evenly by the modules. The valves of the same phase do not have to be switched ON and OFF in unison for parallel connection to succeed.

4.4 Boost Type PWM HVDC Station

Figure 17:
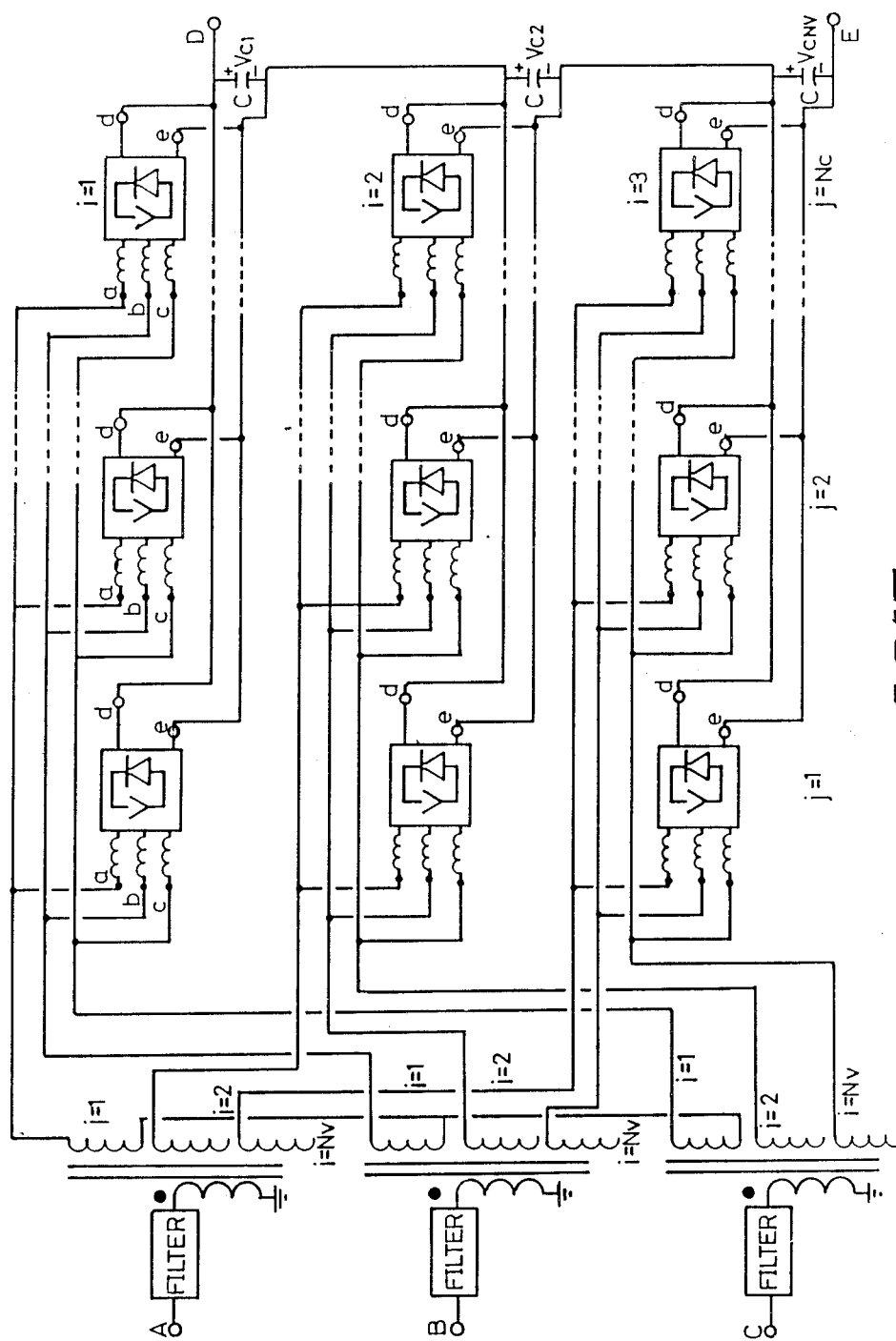
FIG. 17 is a block diagram of a PWM converter station comprising PWM converter modules connected in series and in parallel.

In order to attain the high voltage and the high current rating required of a HVDC application, a matrix of $N_v \times N_c$ modules arranged in series and in parallel as shown in FIG. 17 is used.

4.4.1 Filters

On the AC side, the terminals of the station are A, B and C. A filter at each phase removes the high frequency harmonics so that none enters the utility system. There are several possible versions of the transformer connections.

4.4.2 Transformers

In the example shown in FIG. 17, there is a separate transformer for each phase. In each of the identically built transformers there is a single primary winding. For each transformer, there are $N_v$ secondaries, each with the same number of turns.

The insulation between the secondary windings should be adequate to withstand the difference in DC voltage between them. This is because each of the secondary winding is connected to $N_c$ converter modules in parallel and is associated with a DC voltage $V_{cnv}$ across the common capacitor across the DC link terminals. As the DC link capacitors are connected in series so that the total voltage across the terminals D and E consists of $V_{c1} + V_{c2} + \ldots V_{cnv}$, it is required that (i) the secondary windings of the terminals should float and that (ii) the insulation of the secondary windings should be sufficient to withstand the difference in DC voltages between them.

4.4.3 Floating Neutral

As shown in FIG. 17, the undotted terminals of the i=1 secondary of the A, B and C phase are connected in wye. The neutral is left to "float".

Although not shown, the undotted terminals of the ith secondary of the A, B and C phase should be connected in wye and the neutral terminal is left to "float". This connection is applied to all the secondary windings $i = 1, 2, \ldots N_v$.

The "floating" secondaries enable the DC outputs of the converter modules belonging to the same row to be added so as to increase the total DC output voltage across terminals D and E.

4.4.4 ith Secondary AC Bus

The dotted terminals of the ith transformer secondary of the A, B and C phases are the terminals connecting the 3-phase AC bus system of the ith row of the converter modules. From the ith AC bus, the connections are made to the $N_c$ parallel converter modules at the terminals a, b, c.

4.4.5 ith DC Bus

The d, e terminals of each of the $N_c$ parallel converter modules of the ith row are all connected in parallel to the DC bus. The DC bus has a common capacitor $C_i$ across it and the DC voltage across it is $V_{ci}$.

4.4.6 Plug-In for Service and Maintenance

As each converter module in the matrix of FIG. 17 is connected to the AC-bus to the terminals a, b, c and to the DC bus to the terminals d, e, it can be disconnected easily for service and maintenance.

As there is always a danger involved in "live" maintenance, a defective module can be left in the circuit until the regular maintenance period. The valves should be turned off and the local circuit breakers activated to disconnect the module from the AC bus at the points a, b, c and from the DC bus at the points d, e.

4.5 Multi-Module Control

Figure 18:
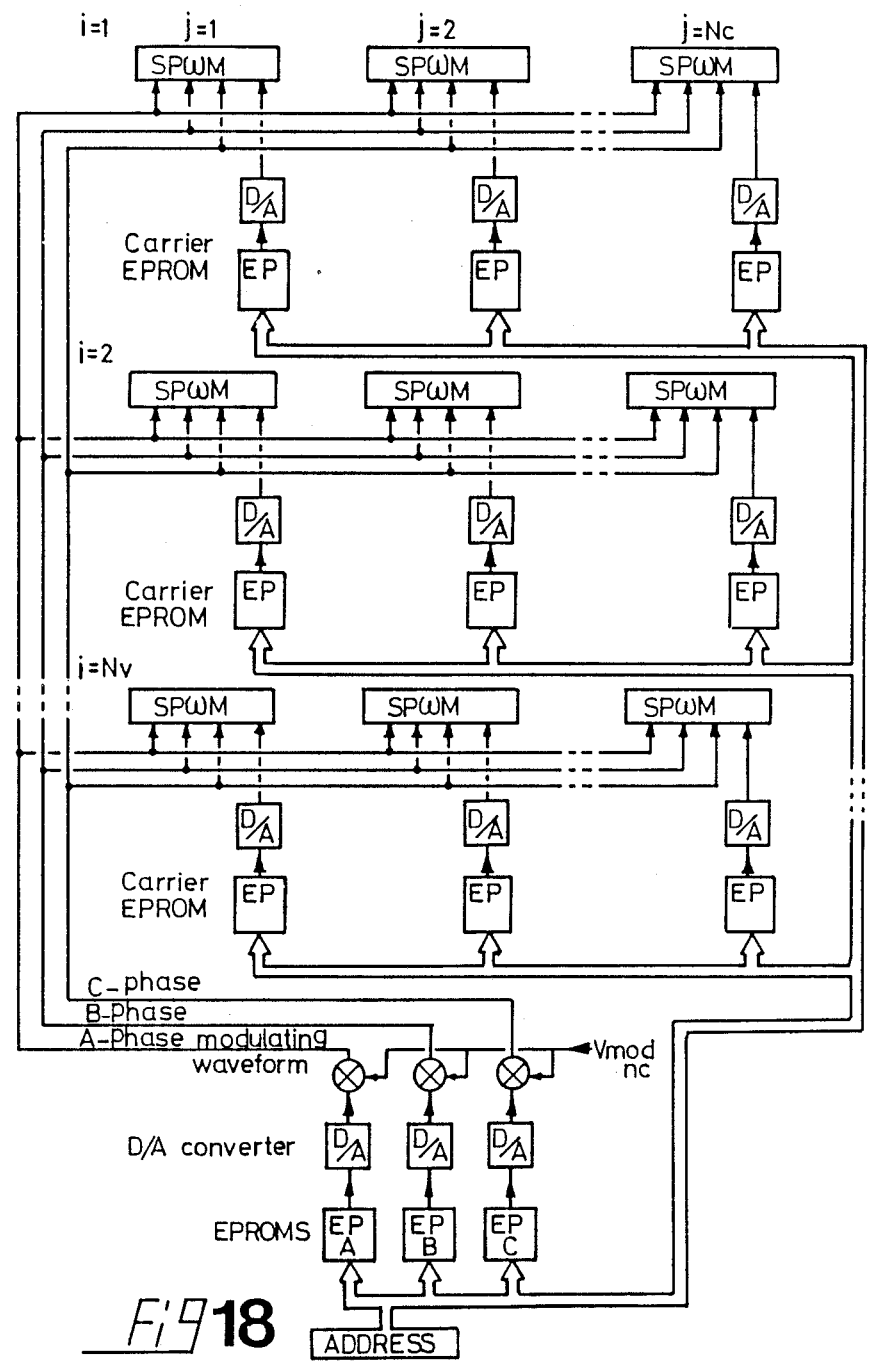
FIG. 18 is a block diagram of the valves control circuit of the converter station shown in FIG. 17.

Based on the block diagrams of the control circuitry outlined in FIG. 10, the control of the matrix of $N_v \times N_c$ converter modules of FIG. 17 is shown in FIG. 18. Each block labeled SPWM in FIG. 18 is the sinusoidal PWM control circuit block of FIG. 10. The sinusoidal PWM control circuit accepts an analog signal of the triangular carrier waveform and an analog signal of the modulating sine waveform of the A-phase, of the B-phase and of the C-phase. There are altogether four analog signal lines. The SPWM control circuit block detects the points of intersection of the modulating waveform with the triangular carrier waveform (as shown in FIG. 7) and sends the gating logic signals to the upper and the lower valve of the corresponding phase so as to switch them ON or OFF thus generating the pulse width modulated voltages of FIG. 6(a).

As shown in FIG. 18, each of the ijth unit ($i = 1, 2 \ldots N_v, j = 1, 2 \ldots N_c$) receives the same modulating waveform for the A, B and C phase. The analog signals of the modulating waveforms are converted by the D/A's from the look-up tablets stored in the three EPROMs. The EPROMs are scanned by the ADDRESS. The VCO and COUNTER in FIG. 10 implement the function of frequency control. The A/D and ADDER implements the function of direct angle control. The amplitude control is achieved by electronically multiplying Vmodc to the analog output lines.

4.6 Harmonic Elimination by Shifted Carrier

As shown in FIG. 18, each module has a separate EPROM for its triangular carrier waveform. Each carrier waveform EPROM is addressed by the same ADDRESS. Essentially, each EPROM contains the same information to generate the triangular carrier waveform as illustrated in FIG. 7. The only difference is that the triangular carrier waveform of each module has its allotted phase shift which is an integral multiple of $\theta$sh.

Figure 19:
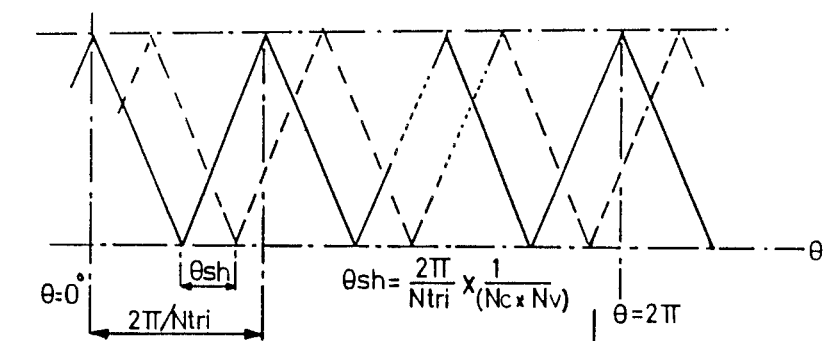
FIG. 19 is a diagram of waveform patterns of carrier signals used to regulate the operation of the valves of the converter station shown in FIG. 17.

As illustrated in FIG. 19, there are $N_{tri}$ triangles in the period $0 < \theta < 2\pi$ so that the period of each triangle is $2\pi N_{tri}$. The basic carrier angle shift for ($N_c \times N_v$) modules is $$\theta_{sh} = \frac{2\pi}{N_{tri}} \times \frac{1}{(N_c \times N_v)}$$

The solid line and the dashed line illustrate the principle of the shifted carrier. When the triangular carrier waveform of FIG. 19 is described mathematically as: $Tr(\theta)$, then the shifted carrier of the ijth module of FIG. 18 is $$Tr_{ij}(\theta[(i-1)N_v+j]\Theta_{sh})$$

when the contents of each EPROM contain the digitized form of $Tr_{ij}(\theta)$, for $i=1,2\ldots N_v$ and $j=1,2,\ldots N_c$, it can be proved mathematically that all harmonics are eliminated until the $(Nt_{ri} \times N_c \times N_v)$ th harmonic. This harmonic elimination principle has been demonstrated by experiment and by digital simulation.

The reason for using the principle of phase angle shifted carrier is that for the same high quality of output voltage waveform on the primary side of the transformers in FIG. 17, the valves in each of the converter modules do not have to switch at a fast rate. Having chosen a value for the $(Nt_{ri} \times N_c \times N_v)$ as the lowest uneliminated harmonic number, the number of triangles $Nt_{ri}$ in each cycle does not have to be a big number when the number of modules employed in the station $(N_c \times N_c)$ is large. This implies that relatively slow electronically triggered power switches such as GTOs or even force-commutated thyristors can be used as valves. This has the further implication that the switching losses are reduced by $1/(N_c \times N_v)$.

The phase angle shift principle essentially staggers the switching instants of $N_c \times N_v$ modules so as to give the appearance of a fast switching rate.

4.7 Even Distribution of Voltage Stress

Although the voltage across D and E in FIG. 17 has to be a high voltage for HVDC transmission, the voltage stress across each valve in each module is only $1/N_v$. By careful design of the transformers, the inductors L and the capacitors C, the voltage $vc_i$ across the DC link capacitor Ci can be made approximately equal.

4.8 Even Distribution of Current Stress

By making the transformer voltages, the inductances L and the capacitances C to be equal within reasonable tolerances, the current through the valves are evenly distributed. Thus the current carrying capability is increased by $N_c$ times that of a single module.

4.9 Transformers

In FIG. 17, the transformer of each phase consists of a single primary winding with Nv separate secondary windings. The secondary windings are made from identical coils so as to yield identical voltages. The insulation coordination of the secondary windings must take into account the difference of the DC voltage between the secondary coils.

An alternative scheme is to have for each phase $N_{vp}$ separate transformers, each having one primary winding and one or more separate secondaries. The total number of separate secondaries is $N_v$. The secondary windings produce identical voltages. The $Nv_p$ primaries may be connected in series and/or in parallel depending on the requirements which must be satisfied.

In all cases, the floating secondaries of the 3-phases are arranged in the floating wye connection of FIG. 17.

4.10 Harmonic Filters

Harmonic filter design is a well known art in HVDC. Typically, the filter consists of arrays of series $L_k$, $C_k$ elements tuned so that the resonant frequency $$w_k = 1/\sqrt{L_k C_k}$$

coincides with one of the harmonic frequencies which are emitted. In addition, a high pass filter is included to remove the remaining harmonics not suppressed by the tuned circuits.

Figure 20:
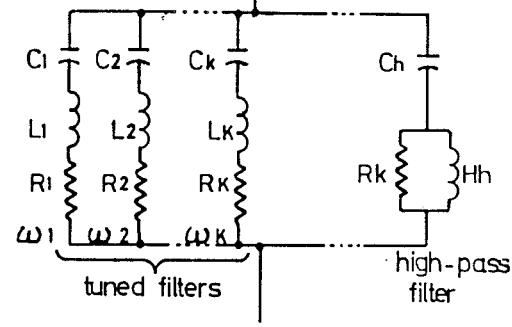
FIG. 20 is a diagram for a filter arrangment for use in a PWM converter.

FIG. 20 shows a typical filter arrangement. In SPWM application, the harmonics which are to be removed are in the high frequency range so that the $L_k$, $C_k$ elements are relatively small and cheap.

5. BOOST TYPE PWM HVDC STATION

5.1 Boost Type PWM HVDC Station

Figure 21:
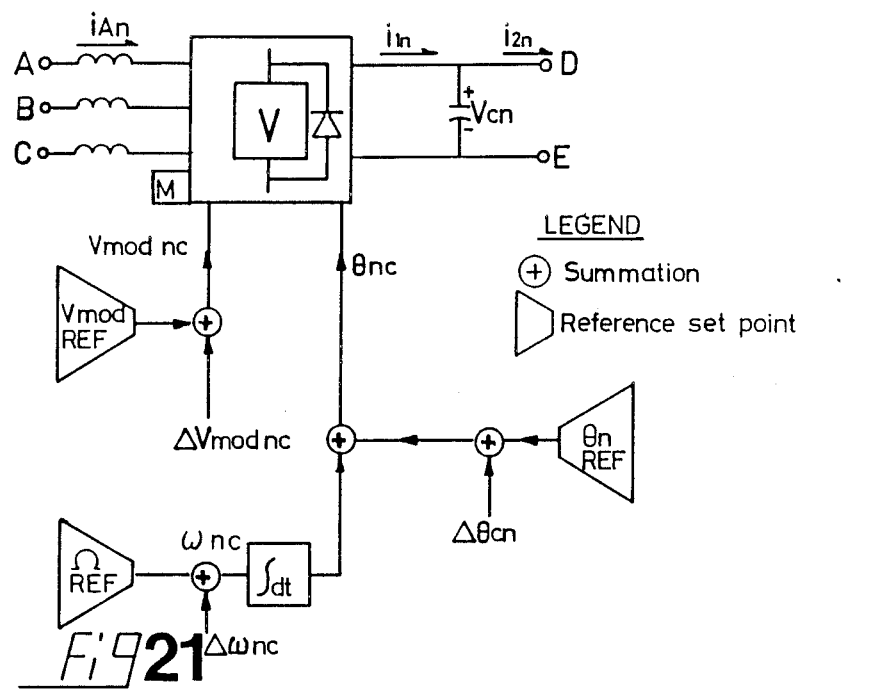
FIG. 21 is a block diagram of a PWM converter station illustrating schematically the control system and its feedback loops for controlling the frequency, the voltage angle and the voltage amplitude.

The boost type PWM HVDC station is represented by the diagram of FIG. 21.

The AC power terminals A, B, C in FIG. 21 correspond to the terminals A,B,C in FIG. 17. Likewise, the DC power terminals D and E, in FIG. 21, are the same as in FIG. 17. Between the AC power terminals and the DC power terminals of FIG. 21 are the harmonic filters, the three phase transformers, the inductors L and the capacitors C, the matrix of three phase PWM bridge modules connected in series and/or in parallel as shown in FIG. 17. Each module has the circuit shown in FIG. 5(b). The modules are operated in the SPWM strategy using the control scheme of FIG. 18 and FIG. 10. As shown in FIG. 10, there are 3 controls:

(a) Voltage amplitude control (Vmodnc);
(b) Frequency control ($\omega$nc); and
(c) Direct Voltage Angle Control ($\theta$nc).

Frequency and direct angle control are not independent and to emphasize that the voltage angle is a time integral of frequency, the diagram of FIG. 21 includes the integration block.

The box M in FIG. 21 represents the measurements which can be made available for feedback control purposes. The quantities which are routinely measured are: AC voltage amplitude, AC current, three-phase AC real power, three-phase reactive power, phase angle, frequency, DC link voltage, DC link current, DC link power, etc. It is within the present art to make these measurements and no further elaboration is necessary.

In this section, the boost type HVDC station of FIG. 21 is viewed in terms of terminal characteristics. When the DC link terminals D,E has a voltage $V_{cn}$ which is large enough to ensure that all the antiparallel diodes are normally reversed biased and when the valves are switching regularly under the SPWM principle, then the line-to-neutral voltages of the terminals A, B, C have a fundamental Fourier harmonic component of the form $$V_{an} = \sqrt{2}\ V_{modn}\sin(w_{nt} + \theta_n)$$

$$V_{bn} = \sqrt{2}\ V_{modn}\sin(w_{nt} + \theta_n - 120°)$$

$$V_{cn} = \sqrt{2}\ V_{modn}\sin(w_{nt} + \theta_n - 240°)$$

The diagram of FIG. 21 highlights the fact that the Voltage amplitude, frequency and angle are controllable by $V_{modnc}$, $W_{nc}$ and $\theta_{nc}$. It is by making use of these controls in feedback loops that the same HVDC station can be made to perform different functions and in integrating several AC systems into a common DC network.

When the AC terminals are connected to an AC system, fundamental Fourier current component are:

$$i_{an} = \sqrt{2}\, I_{nsin}\, (w_{nt} + \theta_n + \alpha_n)$$

$$i_{dn} = \sqrt{2}\, I_{nsin}\, (w_{nt} + \theta_n + \alpha_n - 120°)$$

$$i_{cn} = \sqrt{2}\, I_{nsin}\, (w_{nt} + \theta_n + \alpha_n - 240°)$$

where $\alpha_n$ is the phase angle.

Neglecting switching losses, the power balance equation allows the DC link output current $i2_n$ to be calculated:

$$i2_n + \frac{v_{an}i_{an} + v_{bn}i_{bn} = v_{cn}i_{cn}}{v_{cn}}$$

The boost type HVDC station admits current at any power angle, $0 < \alpha_n < 360°$. Furthermore, power reversal is achieved by negative direction in the flow of the DC link current, when $\cos \alpha_n$ is a negative number, i.e. $90° < \alpha_n < 270°$.

5.2 Boost Type PWM HVDC Station-vs-Generator Station

The direct control over the 3-phase voltages on:
(1) amplitude,
(2) frequency and
(3) voltage angle,
makes the boost type PWM HVDC functionally equivalent to the generator station.

In the generator station, the voltage amplitude is controlled through the field excitation system by voltage regulation. Voltage amplitude serves two functions: (i) reactive voltage control (ii) supplementary control for improving stability and dynamic response.

In the generator station, the governor system regulates the frequency and the real power delivered through the power angle. The governor system opens or closes the valves of the steam or hydro-penstocks in response to the demand.

As the boost type PWM HVDC station has the same three-levels of control, the capabilities of the generator station are duplicated easily. Because the PWM HVDC station has a faster response than the generator station, many of the functions can even be done better.

5.3 Utility System Environment

Figure 22:
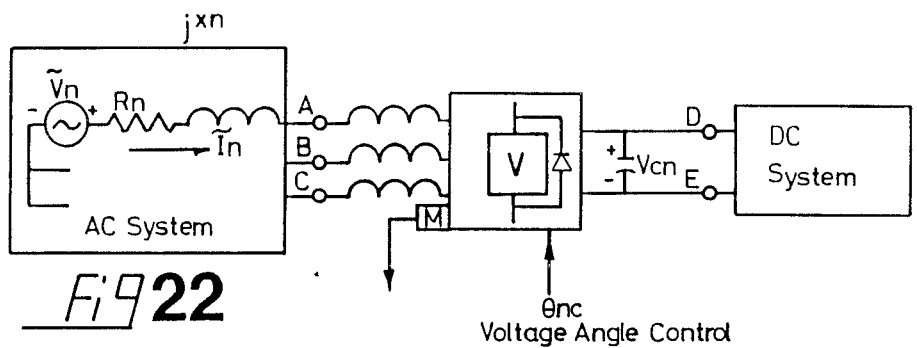
FIG. 22 is a diagram of a PWM converter station connected to a DC and an AC network, the AC network being represented by its Thevenin equivalent.

FIG. 22 shows on a single line diagram the nth boost type PWM HVDC station of FIG. 21 connected to an AC system. The AC system is represented by the Thevenin voltage $\tilde{V}n$ and the Thevenin impedance $Rn+jXn$. As Rn is usually very small compared to Xn, it is neglected hereafter. It is assumed that the DC side has a sustained DC voltage Vcn.

There are several points which must be noted concerning the AC system. Firstly, the frequency of the entire system drifts gradually over a long period around the nominal 50 Hz or 60 Hz. The magnitude of the frequency drift may be quite small but all the same, the PWM HVDC station, which generates its own AC voltage, must track the frequency drift.

The second point to note is that the topology of the AC system is continually changing as different generator units are switched ON or OFF the lines in pursuance of some unit commitment schedules. The loads are themselves being connected or removed from line. As a result, the Thevenin impedance $Rn+jXn$ varies with time.

Furthermore, because the different stations in the power pool have different load flow schedules, the amplitude of $\tilde{V}n$ and its voltage angle also change in time.

In order for the boost type PWM HVDC station to operate in such a dynamic environment, it must have a voltage angle lock loop which ensures that the AC system and the DC system will hang together.

In addition to hanging together, the HVDC station must be capable of fulfilling some assigned function. As will be described, the following functions can be imparted in the PWM HVDC stations by designing the feedback loops:
(1) Power dispatcher; and
(2) Master DC voltage regulator (power slack).

5.3.1 Real Power Control by Voltage Angle

Figure 23A:
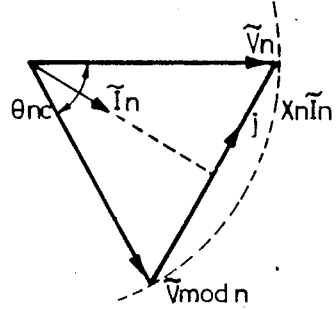
FIGS. 23a and 23b are phasor diagrams showing the voltage angle control in a PWM converter in the rectifier and in the inverter mode respectively.

Real power is controlled through the voltage angle. This is illustrated through the phasor diagram of FIG. 23, where the voltage amplitude of the PWM HVDC station $|\tilde{V}modc|$ is made equal to the amplitude of the Thevenin voltage $|\tilde{V}n|$. Assuming Rn=0, the voltage drop $jXnIn$ is the closing side of the voltage triangle subtended by the angle $\theta_n$. The current In makes an angle $\theta n/2$ between the two voltage phasors. In fact, it can be easily proven that the power converted from AC to DC is $P = -3[|\tilde{V}_{modn}||\tilde{V}_n|\sin \theta_n/X_n]$, so that power is controlled through the voltage angle $\theta nc$. FIG. 23(a) and (b) show that for negative and positive values of $\theta_n$ the PWM HVDC station is operating as a rectifier and an inverter respectively.

Note that $\theta_{nc}=0$ corresponds to the voltage angle of the Thevenin voltage. This is the voltage angle at the terminals of the utility system, just before the synchronizing switches are closed for connecting the PWM HVDC station to the AC system. In the synchronizing procedure (the same as connecting an alternator to the line), the PWM HVDC station must fulfill the conditions that (1) its frequency is the same as that of the AC system, (2) $|\tilde{V}modn|$ is the same as $|\tilde{V}n|$, and (3) the phase angle $\theta_n=0$. From FIG. 21, one sees that VmodREF and $\Omega$REF can be adjusted to make the voltage amplitude equal. $\theta$REF is adjusted to make the phase angle equal.

After synchronization, $\theta$REF is then adjusted to set $\theta n$ so as to deliver the desired power. The PWM HVDC station is made into a rectifier by making $\theta n$ negative and the DC link current $i2_n$ is positive. By making $\theta n$ positive, the station becomes an inverter and the DC link current is negative. It is assumed throughout that the DC link is supplied with a DC voltage Vcn.

This voltage angle control is identical to power control in a power station consisting of AC generators. In AC generators, the rotor magnetic field flux axes are advanced or retarded with respect to the armature reaction flux axes by the opening or the closing the hydro or steam turbine valves. This has the same effect as changing the voltage angle of the AC generators with respect to the rest of the AC system which can also be represented as a Thevenin voltage as has been done in FIG. 22 and FIG. 23.

5.3.2 Reactive Power Control by Voltage Amplitude

Figure 24:
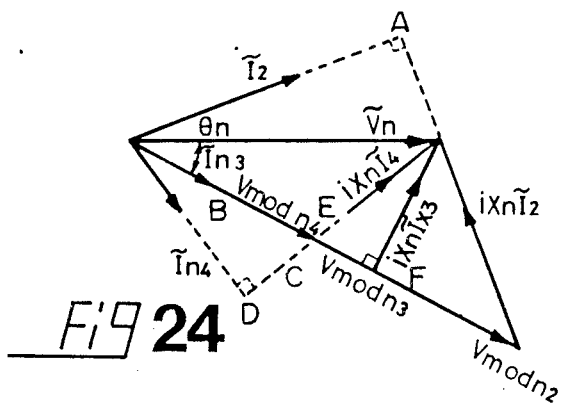
FIG. 24 is a phasor diagram showing lagging and unity power factor operation by changing the voltage amplitude.

For a fixed power angle $\theta_n$ by adjusting the voltage amplitude control of FIG. 21, the phasor diagram of FIG. 24 shows that current phasor $\tilde{I}n$ can be made to lead or lag $\tilde{V}$modn. The real power is also affected. However, the reactive power is more sensitive to changes in $|\tilde{V}modn|$.

Just as with excitation field control of generators, over-excitation $\tilde{V}$modn increases the leading reactive VAR and under-excitation $\tilde{V}$modn4 gives rise to lagging reactive VAR. Unity power factor is also achievable at $\tilde{V}$modn2.

Up to the present, the boost type PWM HVDC converter has been presented so as to show its control capabilities under open loop conditions. In the subsequent sections, the controls will be combined with feedback loops so as to achieve regulatory functions.

5.4 Power Dispatcher

Figure 25:
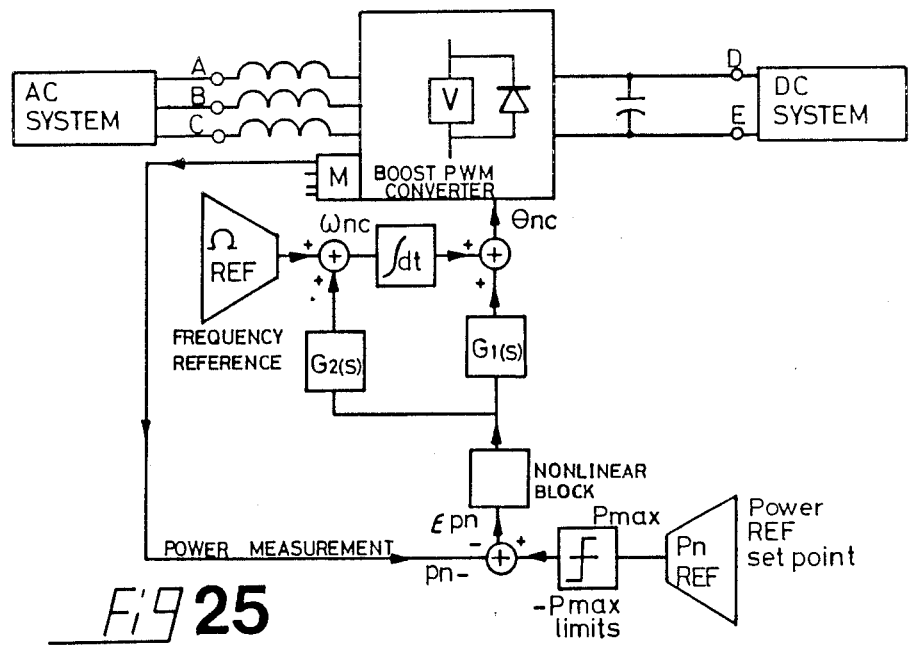
FIG. 25 is a diagram showing a negative feedback implementation of a PWM converter operating as a power dispatcher.

From load flow studies, each converter is assigned a real power load PnREF which it must maintain. PnREF may be positive or negative whereupon it must function as a rectifier or inverter respectively. The block diagram of FIG. 25 shows how the power is regulated.

It is assumed that the DC voltage Vcn is maintained at a constant value by the master DC voltage regulator which will be discussed in section 5.5. The voltage amplitude control is set to a fixed value by VmodREF.

The real power of the converter Pn is measured (on either the AC side or the DC side) and compared with the reference PnREF. The error $$\epsilon_{pn} = P_{nREF} - P_n$$

is used as a negative feedback signal to increase or to decrease the voltage angle $\theta_n$ until the error is nulled. It is important to emphasize that the power is controlled by changing the voltage angle.

A combination of proportion, integral and differential control is envisaged. As Pn is a nonlinear function of $\theta_n$, the control circuitry is likely to include inverse nonlinear function blocks which serve to linearize the control system. The details in the implementation may vary. It is within the present art of control theory to ensure that the feedback is stable, fast and robust.

The transfer functions G1(s) and G2(s) will have to be designed in the context of the system parameters and the power loading. As Pn is a nonlinear function of $\theta_n$, the coefficients of the transfer functions G1(s) and G2(s) will be power load dependent in order to ensure fast, stable response.

The negative feedback loop in which (1) the indirect angle control through $W_{nc}$ and (2) the direct angle control through $\theta_{nc}$ are driven by the error signal (based on the difference between the power dispatch reference and the measured real power) forms a voltage angle lock loop.

The voltage angle lock loop ensures that the assigned dispatched power is fulfilled in spite of: (1) changes in the AC utility system which affect the frequency, the voltage amplitude and the voltage angles, (2) changes in the DC system which affect the DC voltage at the DC link terminals, (3) changes in the control circuitry which affect the voltage supplies and circuit components.

As a safety precaution, the assigned power PnREF must be screened so that it does not exceed the power limits Pmax, $$P_{max} = \text{Thermal Limits}$$

The limit block in FIG. 25 serves this function.

By using the power error signal, (the difference between the power reference PnREF and the measured power Pn) as a negative feedback signal to shift the voltage angle $\theta nc$ of the AC voltage of the boost converter until the error is nulled, one can make the converter into a power dispatcher. The power dispatcher can either be a rectifier or inverter depending on the polarity of Pn.

The nonlinear block, the transfer functions G1(s) and G2(s) in FIG. 25 are for illustrative purposes only. The detail design must consider the circuit parameters and the rest of the system to which the power dispatcher will be connected.

5.5 Master DC Voltage Regulator

In all the discussions up to this point, it has been implicity assumed that the DC link voltage Vn exists. For this reason, at least one of the boost type PWM HVDC stations has to be dedicated to the purpose of DC voltage regulation.

Figure 26:
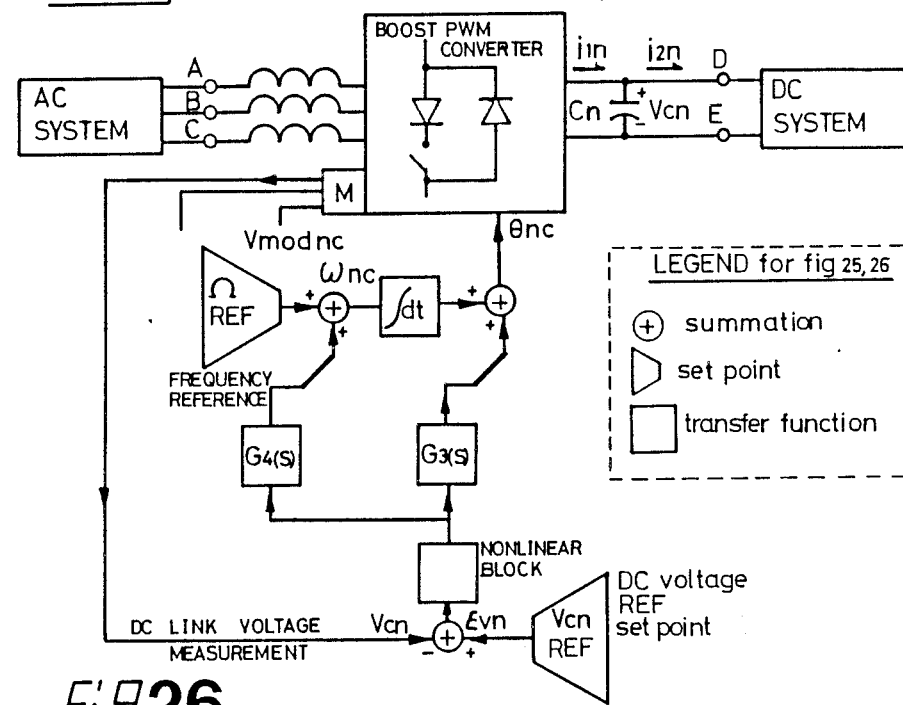
FIG. 26 is a diagram showing a negative feedback implementation of a PWM converter operating as a master DC voltage regulator.

As shown in FIG. 26, the voltage Vn is the voltage across the DC link filter capacitor Cn. From Kirchoff's Current Law, the capacitor charging current $$C_n \frac{dv_{cn}}{dt} = i_{1n} - i_{2n}$$

where i2n output current and i1n is the DC current of the master DC voltage regulator. Integrating this equation $$V_{cn}(t) = V_{cn}(0) + \frac{1}{C_n} \int_0^t (i_{1n} - i_{2n}) dt$$

where Vcn(0) is the voltage evaluated at t=0 due to charging from an earlier period $$V_{cn}(0) = \frac{1}{C_n} \int_{-\infty}^{0} (i_{1n} - i_{2n}) dt$$

As shown in FIG. 26, the voltage Vcn is measured and compared with a voltage reference VcnREF. The voltage error $$\epsilon_{vn} = V_{cnREF} - V_{cn}$$

is used as a command in a negative feedback loop in conjunction with the transfer function G3(s) and G4(s) to adjust the voltage angle control $\theta_{nc}$ of the boost type PWM HVDC converter so as to null the error.

The transfer function G3(s) and G4(s) in general can be a combination of proportional, integral, and derivative feedbacks.

One sees that in maintaining a constant DC link voltage, it is required that $$i2n = i1n$$

Figure 23B:
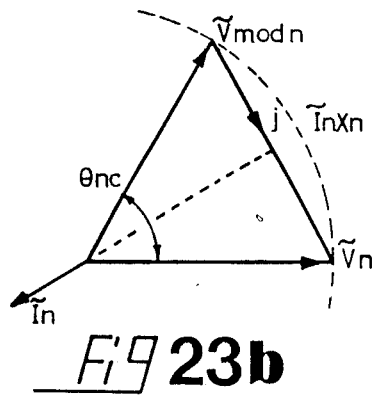

Neglecting ohmic losses, from FIG. 23

$$i_{2n} = \frac{-3|V_n||V_{modn}|\sin\theta_n}{X_n V_{cn}}$$

This means that $\theta_n$ is adjusted by the negative feedback until the power from the AC system satisfies the power demand $V_{cn}i_{2n}$.

The negative feedback loop in which (1) the indirect angle control through $W_c$ and (2) the direct angle control through $\theta_c$ are driven by the voltage error signal to form a voltage angle lock-loop. The voltage angle lock loop ensures that the master DC voltage regulator is always in "frequency lock" with the AC utility in spite of the fact that the frequency and the voltage angle of the AC utility fluctuate and drift with time. The frequency lock is maintained in spite of drifts in the DC voltage supplies and components in the control circuitry of the master DC voltage regulator.

It should be emphasized that the master DC voltage regulator maintains the reference DC voltage by adjusting its AC power intake so that the charge across the DC link capacitor remains constant at the desired level. This means that the AC power converted to DC power (or vice versa) is always just sufficient to make up for the DC output power leaving (or entering) the DC terminals. For this reason the master DC voltage regulator is automatically a power slack. The right amount of AC power is converted by the master DC voltage regulator (without remote controls) to satisfy the power requirements of the other power dispatchers connected to the DC network. When all the other power dispatchers are assigned rectifier duties, the master DC voltage regulator automatically reverses its role into that of an inverter.

It should be reiterated that the master DC voltage regulator adjusts its AC power intake by the voltage angle control.

5.6 Control of Amplitude of Self-Regulated AC Voltage

From SPWM theory, it can be shown that the amplitude of the AC voltage is given by the formula:

$$|V_{modn}| = |V_{modnc}|\frac{V_{cn}}{V_t}$$

where
|Ṽmodnc| = amplitude of sinusoidal modulating waveform
Vt = peak of triangular carrier waveform
$V_{cn}$ = DC link voltage In the control implementation as shown in FIG. 10, the triangular carrier waveform is always made proportional to the DC link voltage Vcn. This is accomplished first by measuring the DC link voltage. After filtering it to remove the switching ripples, the signal is multiplied to the D/A output of the triangular carrier EPROM. Since Vt, the denominator in the above equation, is proportional to Vcn, it cancels out the numerator term so that the amplitude of the AC voltage, |Ṽmodn|, is not affected by variations in the DC link voltage. The AC voltage amplitude is directly controlled by V$_{modn}$-REF.

The AC voltage is supported at all times by the DC link voltage Vcn. Using the triangular carrier to compensate, the AC voltage amplitude is made insensitive to variations in Vcn.

This compensation method enables the PWM HVDC station to operate without an AC voltage regulator feedback loop. The AC voltage regulator would have consisted of setting an AC voltage reference, measuring the AC voltage amplitude by a transducer, making comparisons and using the error to control |Ṽmodnc| in a negative feedback loop. Besides eliminating the cost of the AC voltage regulator, the advantage is that the system dynamic is simpler to analyse as it is not encumbered by one more feedback loop. Furthermore, it frees the controller |Ṽmodn| for duties concerned with improving system stability and dynamic response.

5.7 Self Supported AC Voltages for DC Capacitors

The self-regulated AC voltage discussed in section 5.6 is an active voltage support. This contrasts sharply with conventional HVDC which does not provide active AC voltage support at their terminals. Thus in the case where the AC transmission lines are long, the voltage drop associated with the large line impedance results in severe voltage drop at the conventional HVDC terminals. This must be corrected by AC shunt capacitor compensation in conjunction with static VAR controllers.

In the boost type PWM HVDC system, as long as Vcn exists, the AC voltage also exists and provides active AC voltage support. The DC voltage Vcn is maintained by the master DC voltage regulator through charging the DC link capacitors. DC link capacitors can be electrolytic type which are cheaper than AC capacitors.

5.8 Reactive VAR Control

Unlike conventional HVDC stations which cannot operate with leading power factor, the boost type PWM HVDC stations can operate with phase angle for 0°–360°.

Both the power dispatcher of section 5.4 and the master DC voltage regulator of 5.5 will automatically absorb the VARs associated with the real power which are being delivered provided the MVA ratings of the HVDC stations are adequate. As the MVA of HVDC stations are more expensive than the cost of switched capacitors and/or switch inductances, reactive VAR control is more economically handled by switched capacitor/inductor banks. FIG. 27(a) shows such a bank at the AC terminals of a boost type PWM HVDC station (the transformer is not shown). The switches S1, S2... SN−1, SN may be mechanical switches, thyristor switches or other forms which are activated by electronically logic signals based decisions made from the VARs measured as entering the boost type PWM HVDC station.

As capacitors and inductors can only be increased and decreased in quantized steps, the boost type PWM converter has to be slightly over-rated so that it can offer a continuous transition of reactive VARs between the quantized steps.

FIG. 27(b) shows the hysteresis band control by which the decision logic of the bank switches are operated. There are two switch thresholds, the capacitive VAR limit and the inductive VAR limit which are based on the converter ratings. As the measured capacitor VAR demand increases and reaches the upper threshold, a capacitor from the bank is connected as in $t_1$. As the demand continues, another capacitor is connected as in $t_2$. When the demand decreases and reaches the inductive VAR limit as in $t_3$ and $t_4$ capacitors are successively switched off. After all the capacitors have been disconnected, further demands of inductive VARs will result in inductances being connected.

The art of implementing switched capacitors and switched inductors in conjunction with static VAR controllers is well developed. An interesting aspect of the invention is that the static VAR controller is made unnecessary because the boost type PWM HVDC station can be made to serve the function of providing the continuous VAR control between the quantum jumps between two switchings.

5.9 Stability and Dynamic Performance Enhancement

In the synchronous generators, feedback control through the field excitation system improves the system stability and system dynamics. Typically a transducer measures the frequency in the AC line, compares it with the reference frequency and the frequency deviation is passed through a transfer function block called the power system stabilizer (PSS). The output of the power system stabilizer (PSS) is inputted to the field excitation system which ultimately controls the amplitude of the generator voltage.

FIG. 28 shows a typical schematic diagram of a stabilizing signal to the field excitation system of a generator. The field time constant is long and the PSS has to overcome this deficiency.

By comparison, the boost type PWM HVDC station has three fast time response levers of control: (1) voltage amplitude $\Delta V_{modcn}$, (2) frequency $\Delta w_c$, (3) voltage angle $\Delta \theta_c$ to which supplementary signals can be added for stability and dynamic performance enhancement.

The design of the supplementary feedback system depends on individual situations. In the first place, one needs to determine which modes need to be stabilized or need to have the damping improved. Next, one must test if the modes in question are controllable by any one of the three levers of supplementary control. Then one has to test if the modes in question are observable by the variables which are accessible to measurements, e.g. voltage, current, real power, reactive power, etc. If not, one may have to construct observers so that the mode in question is observable for corrections to be made using a feedback loop.

FIG. 29 illustrates the supplementary feedback system for stability and dynamic performance enhancement. Feedback loops are constructed using the measurements in which the modes whose performance need enhancing are observable (or can be made observable through observers). The transfer function $G_6(s)$, $G_7(s)$ and $G_8(s)$ are designed to connect the feedback commands based on the measured variables to the 3 levers of control: (1) voltage amplitude $\Delta V_{modn}$, (2) frequency $\Delta W_{nc}$ and (3) voltage angle $\Delta \theta_{nc}$.

The detail design of feedback loops for stability and dynamic performance enhancement is left to the individual situation.

The claim here is that the three levers of control enable stability and dynamic performance enhancement to be incorporated together with other duties. Specifically, the voltage amplitude control is deliberately left unencumbered of other duties so that stability and dynamic performance design can be simple.

6. BOOST TYPE PWM HVDC SYSTEMS

6.1 Multi-Terminal DC Transmission System

Based on the two building blocks:
1. Power dispatcher (5.4) DISP
2. Master DC Voltage Regulator (5.5) VR their DC terminals can be connected in a parallel grid as in the example shown in FIG. 30. For security reasons, redundancy through multiple routes in the grid should be provided.

Since the DC link voltage is the sine-qua-non of the system, any short circuit fault across the DC lines must be isolated by circuit breakers. The Master DC Voltage Regulator must survive all contingencies. Back-up units may be desirable. When more than one Master D.C. Voltage Regulator are in the DC grid, their reference voltage $V_{cnREF}$ (see FIG. 26) must be coordinated so that their slack power are partitioned according to planning. The DC voltages at the terminals of the Power Dispatcher units are supported by $V_{cnREF}$ of the master DC Voltage Regulators and differ from $V_{cnREF}$ by the voltage drops of the DC line resistances. As illustrated in FIG. 30, four AC Systems (which may be at different frequencies) are interconnected by the DC grid through five converter stations. AC System no. 4 is integrated at two points through stations no. 4 and no. 5.

The two building blocks of power dispatchers, master DC voltage regulator offer flexibility in intersystem power exchanges with local controls.

Power Dispatchers (DISP)

Converter stations no. 2, no. 3, and no. 4 in the example of FIG. 30 are Power Dispatcher units described in Section 5.4. It is assumed that AC systems no.2, no. 3 and no. 4 have decided to sell or purchase fixed schedules of power P2, P3 and P4 at these converter stations. Rectification of inversion are respectively represented by the positive or negative sign in the power designation.

Master DC Voltage Regulator (VR)

As mentioned in Section 5.5, the Master DC Voltage Regulator is a power slack. It delivers (as a rectifier) or absorbs (as an inverter) the left-over power of the other stations in the grid. Thus if one neglects the ohmic losses in the DC grid, in the example of FIG. 30, the power P1 and P5 of the Voltage Regulators are described by $$P1 + P5 = -(P2 + P3 + P4)$$

By adjusting the voltage setting $V_{cnREFl}$ in FIG. 26 of unit no. 1 and no. 5, it is possible to allocate the share of the slack power in the two units as the DC line resistances are known.

6.2 Radial DC Transmission System

A special case of FIG. 30 is the radial DC transmission system of FIG. 31. In this case, the AC system 1 consists entirely of generator units (from the Hydro Electric or the Mine Mouth Resource). The electric power is transported over a corridor over long distance by one or more parallel DC transmission lines. In the AC system 2, the DC power is inverted to AC power to be transmitted and distributed to the industrial and commercial uses.

As the flow of power is unidirectional, from AC system no. 1 and no. 2 all the converter sations in AC system no. 1 are rectifiers and those in AC system no. 2 are inverters. Converter stations dedicated for exclusive use are rectifiers and inverters are described in Section 6.4.

The function of master DC voltage regulator (VR) is performed by either the rectifier of the inverter. The boost type PWM HVDC station on the other end of the long DC transmission line is the power dispatcher station.

6.3 Radial Back-to-Back DC Link

Another special case of FIG. 30 is the radial asynchronous link in which AC system no. 1 and no. 2 are linked through long AC transmission lines as shown in FIG. 32. The converter station on one side functions as the master DC Voltage Regulator and the other side as Power Dispatcher.

The AC terminal voltages of the converter stations are maintained at constant amplitude by the DC link voltage. Because of the AC line impedance, the real power adjustment is accompanied by reactive power adjustments (see FIG. 23). As discussed in Section 5.8 banks of switched capacitors and inductors should absorb the reactive power, while the converter stations should be slightly over-rated to handle the smooth transmission between quantum jumps of the VARs coming from connecting and disconnecting capacitors or inductors to the circuit (see FIG. 27).

6.4 Dedicated Rectifiers and Dedicated Inverters

FIG. 5(b) shows in detail the 3-phase bridge converter which is seen as consisting of upper and lower valves 1U, 2U, 3U and 1L, 2L, and 3L, respectively. The antiparallel diodes DU and DL are connected across the power semiconductor switches to permit current flow in the opposite direction.

In PWM operation, the ON and OFF duration of the valves are controlled so that the output current $i_1$ can be positive or negative. When the switching pattern is that of a rectifier, the positive flow of $i_1$ dominates over that of the reverse flow. For positive $i_1$, the current path is through a diode and for negative $i_1$, it is through a valve. Thus, when the converter is designed exclusively as a rectifier, the current ratings of the antiparallel diodes are higher than those of the valves.

For exclusive use as an inverter, the current ratings of the valves should be higher than those for the antiparallel diodes.

Some savings in cost can therefore be made in consideration of the different current ratings required for the valves and the antiparallel diodes when the converter is designed as a dedicated rectifier or a dedicated inverter.

6.5 Multiple Role Convertibility

The PWM HVDC converters are made to function of the 2 roles: (1) power dispatcher, and (2) master DC voltage regulator.

As the cost of the control loops and the feedback measurement transducers are minor compared with the power switch modules, it is expected that each PWM converter will be built with the role changing options. Thus each Power Dispatcher is a standby of the Master DC Voltage Regulator and can assume the role of supporting the DC link voltage should be original DC voltage regulator be incapacitated. The changeover is accomplished by the selection switch in FIG. 33. By controlling the voltage amplitude and the voltage angle of the fundamental harmonic component of the PWM boost type converter using feedback loops described by the functional block diagram of FIG. 33, a superior HVDC converter and system can be realized.

6.6 Reactive VAR Control

In the multi-terminal HVDC connection exemplified by FIG. 30 or the radial links exemplified by FIG. 31 and 32, the AC terminals of the boost type PWM HVDC stations may be equipped with switched capacitors and/or inductors as shown in FIG. 27 and as described in section 5.7. The boost type PWM HVDC station has the capability to absorb and inject reactive VAR's. However, the switched capacitors and/or inductors may be able to reduce the cost. The boost type PWM HVDC station has the limited duty of providing the continuous increase (or decrease) of VAR between the quantum levels between the switchings of fixed capacitors or inductors.

6.7 Stability and Dynamic Performance Enhancement

In the multi-terminal HVDC connection exemplified by FIG. 30 or the radial links exemplified by FIG. 31 and 32, each boost type PWM HVDC station has the supplementary feedback for stability and dynamic enhancement as shown in FIG. 29 and as described in section 5.8.

The above description of a preferred embodiment of the present invention should not be interpreted in any limiting manner since it may be refined in numerous ways without departing from the spirit of the invention.

I claim:

1. A converter for interconnecting a first electric network and a second electric network to transmit electric power from one network to the other, each of said networks being coupled to a respective active power source, said first network including DC link terminals for coupling said first network to said converter, there being a DC voltage having a certain amplitude across the DC link terminals, said second network including AC link terminals for coupling said second network to said converter, there being an alternating voltage at a given substantially fixed frequency across said AC link terminals, said alternating voltage having an amplitude which is always lower than the amplitude of said DC voltage, said converter comprising:

a bridge of valves each associated with an antiparallel diode, each valve of said bridge being capable of assuming two different states, namely an ON staten and an OFF state, in said ON state the valve allowing current to pass therethrough, in said OFF state the valve blocking the passage of current, each diode being normally reverse-biased between said DC and alternating voltage, and said bridge being capable of operating either as an inverter to enable transmission of electric power from the first network to the second one, or as a rectifier to enable transmission of electric power from the second network to the first one;

inductor means interposed between said bridge and said AC link terminals for producing a boost voltage across said inductor means, said boost voltage forward-biasing said diodes to allow the same to conduct electric current to thereby enable operation of said bridge as an inverter and rectifier;

capacitor means across said DC link terminals, said bridge being interposed between the inductor and capacitor means;

valve control means coupled to said bridge for commanding the valves thereof to switch state to operate said bridge as an inverter or rectifier, said valve control means including:

signal generating means for outputting a control signal representative of a desired valve state switching sequence to obtain a bridge voltage waveform having a fundamental Fourier component at a frequency corresponding substantially to the frequency of said alternating voltage; and frequency control means coupled to said signal generating means to adjust said control signal in accordance with adrift of the frequency of said alternating voltage to cause the frequency of said fundamental Fourier component to track the frequency of said alternating voltage.

2. A converter as defined in claim 1, wherein said bridge is a three-phase bridge.

3. A converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

capacitor means across said DC link terminals;

valve control means coupled to said bridge for commanding the valves thereof to switch state, said valve control means including:

(a) signal generating means for outputting a control signal representative of a desired valve state switching sequence to obtain a bridge voltage waveform having a fundamental Fourier component at a frequency corresponding substantially to the frequency of said alternating voltage; and (b) frequency control means coupled to said signal generating means to adjust said control signal in accordance with adrift of the frequency of said alternating voltage to cause the frequency of said fundamental Fourier component to track the frequency of said alternating voltage, said frequency control mens comprising a feedback circuit to generate an error signal representative of a drift between the frequency of said alternating voltage and the frequency of said fundamental Fourier component, wherein said frequency control means adjusts said control signal in accordance with said error signal to keep the frequency of said fundamental Fourier component in synchronism with the frequency of said alternating voltage.

4. A converter for interconnecting a first electric network and a second electric network to transmit electric power from one network to the other each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

capacitor means across said DC link terminals;

valve control means coupled to said bridge for commanding the valves thereof to switch sate, said valve control means including:

(a) signal generating means for outputting a control signal representative of a desired valve state switching sequence to obtain a bridge voltage waveform having a fundamental Fourier component at a frequency corresponding substantially to the frequency of said alternative voltage; and (b) frequency control means coupled to said signal generating means to adjust said control signal in accordance with adrift of the frequency of said alternating voltage to cause the frequency of said fundamental Fourier component to track the frequency of said alternating voltage, wherein said valve control means further includes memory means in which is stored state switching sequence data for the valves of said bridge, and first input means coupled to said memory means for receiving a signal representative of a desired frequency of said fundamental Fourier component, according to the signal received through said first input means, said memory means outputting state switching sequence data allowing to obtain a bridge voltage waveform with a fundamental Fourier component at said desired frequency.

5. A converter as defined in claim 4, wherein said valve control means further comprises a second input means coupled to said memory means for receiving a signal representative of a desired phase angle between said fundamental Fourier component and said alternating voltage, according to the signal received through said second input means, said memory means outputting state switching sequence data to obtain a bridge voltage waveform with a fundamental Fourier component at said desired phase angle.

6. A converter as defined in claim 5, wherein said valve control means further comprises a third input means for receiving a signal representative of a desired amplitude of said fundamental Fourier component, according to the signal received through said third input means, said valve control means outputting a control signal to obtain a bridge voltage waveform with a fundamental Fourier component with said desired amplitude.

7. A converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:
- a bridge of valves, each valve of said bridge being capable of assuming two different states, namely an ON state and an OFF state, in said ON state the valve allowing current to pass therethrough, in said OFF state the valve blocking the passage of current;
- inductor means between said bridge and said AC link terminals;
- valve control means coupled to said bridge for commanding the valves thereof to switch state, said valve control means including:
  - (a) signal generating means for producing a valve state switching signal to obtain a bridge voltage waveform having a fundamental Fourier component at a certain frequency, with a certain amplitude and at a certain phase angle with said alternating voltage;
  - (b) memory means coupled to said signal generating means, in said memory means being stored control data allowing to generate different valve state switching signals, each allowing to obtain a bridge voltage waveform with a fundamental Fourier component at a different frequency;
  - (c) a voltage controlled oscillator for receiving an analog signal representative of the desired frequency of said fundamental Fourier component and generating in response to said analog signal an oscillatory signal representative of said desired frequency;
  - (d) counter means coupled to said voltage controlled oscillator and to said memory means, said counter means counting the oscillations of said oscillatory signal and generating an output signal allowing said memory means to retrieve and output control data allowing said signal generating means to generate a valve state switching signal to obtain a bridge voltage waveform with a fundamental Fourier component at said desired frequency.

8. A converter as defined in claim 7, wherein said valve control means further comprises:
- analog-to-digital converter means for receiving an analog signal representative of a desired phase angle between said fundamental Fourier component and said alternating voltage and for converting the last mentioned analog signal in a digital signal representative of said desired phase angle;
- adder means coupled to said analog-to-digital converter means, to said counter means and to said memory means, said memory means containing control data allowing to generate different valve state switching signals, each corresponding to a bridge voltage waveform with a fundamental Fourier component at a different phase angle with said alternating voltage, said adder means adding said digital signal and the output signal of said counter means and outputting a signal allowing said memory means to retrieve and output control data allowing said signal generating means to generate a valve state switching signal to obtain a bridge voltage waveform with a fundamental Fourier component at said desired phase angle.

9. A converter as defined in claim 8, wherein said valve control means further comprises a digital-to-analog converter means coupled to said memory means for converting control data to a control analog signal.

10. A converter as defined in claim 9, wherein said valve control means further comprises a signal processing means coupled to said digital-to-analog converter means, said signal processing means receiving a signal representative of a desired amplitude of said fundamental Fourier component, said signal processing means combining the last mentioned signal with an output signal from said digital-to-analog converter means to produce a signal allowing said signal generating means to generate a valve state switching signal for obtaining a bridge voltage waveform with a fundamental Fourier component having said desired amplitude.

11. A converter as defined in claim 10, wherein said signal processing means is a multiplier.

12. A converter as defined in claim 11, further comprising an adder including a first input means for receiving a signal representative of a nominal amplitude of said fundamental Fourier component, and a second input means for receiving a signal representative of the desired deviation of the amplitude of said fundamental Fourier component with respect to said nominal amplitude, an output of said adder being coupled to said multiplier.

13. A converter as defined in claim 12, comprising a voltage amplitude feedback means for generating an error signal representative of a difference between the amplitude of said fundamental Fourier component and said nominal amplitude, said voltage amplitude feedback means being coupled to said adder for applying to said error signal to said second input means.

14. A converter as defined in claim 8, wherein said valve control means further comprises:
- signal processing means coupled to said analog-to-digital converter means, said signal processing means including;
  - (a) first input means for receiving an analog signal representative of a nominal phase angle between said fundamental Fourier component and said alternating voltage; and
  - (b) second input means for receiving a signal representative of a desired deviation of the phase angle between said fundamental Fourier component and said alternating voltage with respect to said nominal phase angle, said signal processing means processing the signals from said first and second input means and outputting said analog signal representative of the desired phase angle between said fundamental Fourier component and said alternating voltage.

15. A converter as defined in claim 14, comprising a phase angle feedback means for generating an error signal representative of a difference between said nominal phase angle and the phase angle between said alternating voltage and said fundamental Fourier component, said phase angle feedback means being coupled to said signal processing means for applying said error signal to said second input means.

16. A converter as defined in claim 8, wherein said bridge is a three-phase bridge.

17. A converter as defined in claim 16 wherein said memory means comprises:
- a modulating wave memory circuit for each phase of said bridge, the memory circuit for each phase of said bridge being coupled to a respective digital-to-analog converter, each digital to analog converter outputting a modulating wave;

a carrier wave memory circuit coupled to a digital-to-analog converter outputting a carrier wave, said signal generating means comprising modulating means coupled to said memory circuits for separately modulating said carrier wave by the modulating wave for each phase of said bridge, said modulating means outputting a signal for each phase of said bridge representative of a desired valve state switching sequence.

18. A converter as defined in claim 17, wherein said carrier wave is a triangular wave and said modulating wave being a sine wave.

19. A converter as defined in claim 7, wherein said valve control means further comprises:
signal processing means coupled to said voltage controlled oscillator, said signal processing means including;
(a) first input means for receiving a signal representative of a nominal frequency of said fundamental Fourier component;
(b) second input means for receiving a signal representative of a desired deviation of the frequency of said fundamental Fourier component with respect to said nominal frequency, said signal processing means processing the signals from said first and second input means and outputting said analog signal.

20. A converter as defined in claim 19, wherein said signal processing means is an adder.

21. A converter as defined in claim 19, further comprising a frequency feedback means for generating an error signal representative of a drift between the frequency of said alternating voltage and the frequency of said fundamental Fourier component, said frequency feedback means being coupled to said signal processing means for applying said error signal to said second input means.

22. A converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:
a bridge of valves, each valve of said bridge being capable of assuming two different states, namely an ON state and an OFF state, in said ON state the valve allowing current to pass therethrough, in said OFF state the valve blocking the passage of current;
inductor means between said bridge and said AC link terminals;
valve control means coupled to said bridge for commanding the valves thereof to switch state, said valve control means including:
(a) signal generating means for outputting a valve state switching signal to obtain a bridge voltage waveform having a fundamental Fourier component at a certain frequency and at a certain phase angle with said alternating voltage; and
(b) frequency and phase angle control means coupled to said signal generating means, said frequency and phase angle control means including:

(i) a first signal processing circuit for receiving a signal representative of a desired frequency of said fundamental Fourier component and generating in response an output signal whose instantaneous value is representative of the voltage angle of said fundamental Fourier component with respect to a certain reference;
(ii) a second signal processing circuit having first and second inputs and an output, said first input being coupled to said first signal processing circuit and said output to said signal generating means, said signal processing circuit receiving at said second input a signal representative of a desired phase angle between said fundamental Fourier component and said alternating voltage and outputting a signal allowing said signal generating means to produce a valve state switching signal to obtain a bridge output waveform having a fundamental Fourier component at said desired frequency and at said desired phase angle with said alternating voltage.

23. A converter as defined in claim 22, wherein said frequency and phase angle control means further comprises:
an adder having two inputs and an output coupled to said first signal processing circuit, at one of the inputs of said adder being applied a signal representative of a nominal frequency of said fundamental Fourier component and at the other input of said adder being applied a signal representative of a desired deviation of the frequency of said fundamental Fourier component with respect to said nominal frequency.

24. A converter interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:
a bridge of valves, each valve of said bridge being capable of assuming two different states, namely an ON state and an OFF state, in said ON state the valve allowing current to pass therethrough, in said OFF state the valve blocking the passage of current;
inductor means between said bridge and said AC link terminals;
valve control means coupled to said bridge for commanding the valves thereof to switch state, said valve control means including;
(a) signal generating means for outputting a valve state switching signal to obtain a bridge voltage waveform having a fundamental Fourier component at a certain frequency and at a certain phase angle with said alternating voltage; and
(b) frequency and phase angle control means coupled to said signal generating means, said frequency and phase angle control means including:
(i) a first signal processing circuit for receiving a signal representative of a desired frequency of said fundamental Fourier component and generating in response an output signal whose instantaneous value is representative of the phase angle of said fundamental Fourier component with respect to a certain reference;

(ii) a second signal processing circuit having first and second inputs and an output, said first input being coupled to said first signal processing circuit and said output to said signal generating means, said second signal processing circuit receiving at said second input a signal represntative of a desired phase angle between said fundamental Fourier component and said alternating voltage and outputting a signal allowing said signal generating means to produce a valve state switching signal to obtain a bridge voltage waveform having a fundamental Fourier component at said desired frequency and at said desired phase angle with said alternating voltage;

wherein said frequency and phase angle control means further comprises:

an adder having two inputs and an output coupled to said first signal processing circuit, at one of the inputs of said adder being applied a signal representative of a nominal frequency of said fundamental Fourier component and at the other input of said adder being applied a signal representative of a desired deviation of the frequency of said fundamental Fourier component with respect to said nominal frequency; and wherein said first signal processing circuit is a voltage controlled oscillator.

25. A converter interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge for commanding the valves thereof to switch state, said valve control means including:

(a) signal generating means for outputting a valve state switching signal to obtain a bridge voltage waveform having a fundamental Fourier component at a certain frequency and at a certain phase angle with said alternating voltage; and (b) frequency and phase angle control means coupled to said signal generating means, said frequency and phase angle control means including:

(i) a first signal processing circuit for receiving a signal representative of a desired frequency of said fundamental Fourier component and generating in response an output signal whose instantaneous value is representative of the phase angle of said fundamental Fourier component with respect to a certain reference;

(ii) a second signal processing circuit having first and second inputs and an output, said first input being coupled to said first signal processing circuit and said output to said signal generating means, said second signal processing circuit receiving at said input a signal representative of a desired phase angle between said fundamental Fourier component and said alternating voltage and outputting a signal allowing said signal generating means to produce a valve state switching signal to obtain a bridge voltage waveform having a fundamental Fourier component at said desired frequency and at said desired phase angle with said alternating voltage wherein said frequency and phase angle control means further comprises:

an adder with two inputs and an output; and an analog-to-digital converter having an input coupled to the output of said adder and also having an input coupled to said second input, at one of the inputs of said adder being applied an analog signal representative of a nominal phase angle between said alternating voltage and said fundamental Fourier component, at the other input of said adder being applied a signal representative of a desired deviation of the phase angle between said fundamental Fourier component and said alternating voltage with respect to said nominal phase angle.

26. A converter as defined in claim 25, wherein said second signal processing circuit is an adder.

27. A converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given substantially fixed frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge for commanding the valves thereof to switch state, said valve control means generating a valve state switching signal to obtain a bridge voltage waveform having a fundamental Fourier component at a certain frequency, at a certain phase angle with said alternating voltage and having a certain amplitude, said valve control means including:

(a) a frequency input means for receiving a signal representative of a desired frequency of said fundamental Fourier component;

(b) a phase angle input means for receiving a signal representative of a desired phase angle between said fundamental Fourier component and said alternating voltage; and (c) an amplitude input means for receiving a signal representative of a desired amplitude of said fundamental Fourier component, said valve control means processing the signals received at said frequency input, phase angle input and amplitude input means and outputting a valve state switching signal for obtaining a bridge voltage waveform with a fundamental Fourier component at said desired frequency at said desired phase angle with said alternating voltage and having said desired amplitude.

28. A converter as defined in claim 27, wherein said frequency input means includes a first input for receiving a signal representative of a nominal frequency of said fundamental Fourier component and a second input for receiving a signal representative of a desired deviation of the frequency of said fundamental Fourier component with respect to said nominal frequency.

29. A converter as defined in claim 27, wherein said phase angle input means includes a first input for receiving a signal representative of a nominal phase angle between said fundamental Fourier component and said alternating voltage and a second input for receiving a signal representative of a desired deviation of the phase angle with respect to said nominal phase angle value.

30. A converter as defined in claim 27, wherein said amplitude input means includes a first input for receiving a signal representative of a nominal amplitude of said fundamental Fourier component and a second input for receiving a signal representative of a desired deviation of the amplitude of said fundamental Fourier component with respect to said nominal amplitude.

31. A converter for interconnecting a first electric network and a second electrical network to maintain the flow of real power from one network to other at a predetermined value, each of said networks being coupled to the respective active power source, said first network including DC link terminals for coupling said first network to said converter, there being a DC voltage having a certain amplitude across the DC link terminals, said second network including AC link terminals for coupling said second network to said converter, there being an alternating voltage at a given frequency across said AC link terminals, said alternating voltage having an amplitude which is always lower than the amplitude of said DC voltage, said converter comprising:

a bridge of valves each associated with an antiparallel diode, each valve of said bridge being capable of assuming two different states, namely an ON state and an OFF state, in said ON state the valve allowing current to pass therethrough, in said OFF state the valve blocking the passage of current, each diode being normally reverse-biased between said DC and alternating voltage, and said bridge being capable of operating either as an inverter to enable transmission of electric power from the first network to the second one, or as a rectifier to enable transmission of electric power from the second network to the first one;

inductor means interposed between said bridge and said AC link terminals for producing a boost voltage across said inductor means, said boost voltage forward-biasing said diodes to allow the same to conduct electric current to thereby enable operation of said bridge as an inverter and rectifier;

capacitor means across said DC link terminals, said bridge interposed between the inductor and capacitor means, the capacitor means for (1) maintaining a DC voltage across said bridge greater than an absolute value of said alternating voltage, and (2) filtering out switching ripples occurring at said DC link terminals;

valve control means coupled to said bridge to command the valves thereof to switch state to operate said bridge as an inverter or rectifier, and to obtain a bridge voltage waveform with a fundamental Fourier component having a frequency corresponding converter, there being a DC voltage having a certain amplitude across the DC link terminals, said second network including AC link terminals for coupling said second network to said converter, there being an alternating voltage at a given frequency across said AC link terminals, said alternating voltage having an amplitude which is always lower than the amplitude of said DC voltage, said converter comprising:

a bridge of valves, each associated with an antiparallel diode, each valve of said bridge being capable of assuming two different states, namely an ON state and an OFF state, in said ON state the valve allowing current to pass therethrough, in said OFF state the valve blocking the passage of current, each diode being normally reverse-biased between said DC and alternating voltage, and said bridge being capable of operating either as an inverter to enable transmission of electric power from the first network to the second one, or as a rectifier to enable transmission of electric power from the second network to the first one;

inductor means interposed between said bridge and said AC link terminal for producing a boost voltage across said inductor means, said boost voltage forward-biasing said diodes to allow the same to conduct electric current to thereby enable operation of said bridge as an inverter and rectifier;

capacitor means across said DC link terminals, said bridge interposed between the inductor and capacitor means, the capacitor means for (1) maintaining a DC voltage across said bridge greater than an absolute value of said alternating voltage, and (2) filtering out switching ripples occurring at said DC link terminals;

valve control means coupled to said bridge to command the valves thereof to switch state to operate said bridge as an inverter of rectifier and, to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage, substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage;

signal processing circuit coupled to said phase angle input means, said signal processing circuit outputting said phase angle signal;

feedback means coupled to said signal processing circuit, said feedback means producing an error signal representative of a difference between the amount of real power flowing through said converter and said predetermined value, said signal processing means receiving said error signal and altering said phase angle signal in accordance with said error signal allowing to obtain a bridge voltage waveform with a fundamental Fourier component at a phase angle with said alternating voltage corresponding to a real power flow through said converter at said predetermined value.

32. A converter as defined in claim 31, wherein said feedback means includes:
first means for producing a signal representative of the amount of real power flowing through said converter;
second means for producing a signal representative of said predetermined value;
third means coupled to said first and second means for processing said signal representative of the amount of real power flowing through said converter and said signal representative of said predetermined value, and outputting said error signal.

33. A converter for interconnecting a first electric network and a second electric network to maintain the flow of real power from one network to the other at a predetermined value, each of said networks being coupled to a respective active power source, said first network including DC link terminals for coupling said first network to said converter, said second network including AC link terminals for coupling said second network to said converter, there being an alternating voltage at a given frequency across said AC link terminals, said converter comprising:
a bridge of valves, each valve of said bridge being capable of assuming two different states, namely an ON state and an OFF state, in said ON state the valve allowing current to pass therethrough, in said OFF state the valve blocking the passage of current;
inductor means between said bridge and said AC link terminals;
valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage;
a signal processing circuit coupled to said phase angle input means, said signal proceeding circuit outputting said phase angle signal;
feedback means coupled to said signal proceeding circuit, said feedback means producing an error signal representative of a difference between the amount of real power flowing through said converter and said predetermined value, said signal processing means receiving said error signal and altering said phase angle signal in accordance with said error signal allowing to obtain a bridge voltage waveform with a fundamental Fourier component at a phase angle with said alternating voltage corresponding to a real power flow through said converter at said predetermined value;
wherein said signal proceeding circuit includes:
(a) means responsive to said error signal to generate a frequency drift error signal indicative of a drift between the frequency of said fundamental Fourier component and the frequency of said alternating voltage; and
(b) means responsive to said frequency drift error signal to alter said phase angle signal for maintaining the frequency of said fundamental fourier component in synchronism with the frequency of said alternating voltage.

34. A converter for interconnecting a first electric network and a second electric network to maintain the flow of real power from one network to the other at a predetermined value, each of said networks being coupled to a respective active power source, said first network including DC link terminals for coupling said first network to said converter, said second network including AC link terminals for coupling said second network to said converter, there being an alternating voltage at a given frequency across said AC link terminals, said converter comprising:
a bridge of valves, each valve of said bridge being capable of assuming two different states, namely an ON state and an OFF state, in said ON state the valve allowing current to pass therethrough, in said OFF state the valve blocking the passage of current;
inductor means between said bridge and said AC link terminals;
valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage;
a signal processing circuit coupled to said phase angle input means, said signal processing circuit outputting said phase angle signal,
feedback means coupled to said signal processing circuit, said feedback means producing an error signal representative of a difference between the amount of real power flowing through said converter and said predetermined value, said signal processing means receiving said error signal and altering said phase angle signal in accordance with said error signal allowing to obtain a bridge voltage waveform with a fundamental Fourier component at a phase angle with said alternating voltage corresponding to a real power flow through said converter at said predetermined value wherein said feedback means includes:

first means for producing a signal representative of the amount of real power flowing through said converter;

second means for producing a signal representative of said predetermined value;

third means coupled to said first and second means for processing said signal representative of the amount of real power flowing through said converter and said signal representative of said predetermined value, and outputting said error signal; and wherein said signal processing circuit includes:

fourth means for generating a signal representative of a nominal frequency of said fundamental Fourier component;

fifth means coupled to said fourth means and to said third means, said fifth means processing the signal representative of a nominal frequency of said fundamental Fourier component and said error signal, and outputting said frequency drift error signal.

35. A converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given frequency across said AC link terminals, said converter maintaining a voltage across said DC link terminals at a predetermined value, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage;

signal processing circuit coupled to said phase angle input means, said signal processing circuit outputting said phase angle signal;

feedback means coupled to said signal processing circuit, said feedback means producing an error signal representative of a difference between the voltage across said DC link terminals and said predetermined value, said signal processing means receiving said error signal and altering said phase angle signal in accordance with said error signal allowing to obtain a bridge voltage waveform with a fundamental Fourier component at a phase angle with said alternating voltage corresponding to a voltage across said DC link terminals at said predetermined value.

36. A converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given frequency across said AC link terminals, said converter maintaining a voltage across said DC link terminals at a predetermined value, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage;

signal processing circuit coupled to said phase angle input means, said signal processing circuit outputting said phase angle signal;

feedback means coupled to said signal processing circuit, said feedback means producing an error signal representative of a difference between the voltage across said DC link terminals and said predetermined value, said signal processing means receiving said error signal and altering said phase angle signal in accordance with said error signal allowing to obtain a bridge voltage waveform with a fundamental Fourier component at a phase angle with said alternating voltage corresponding to a voltage across said DC link terminals at said predetermined value wherein said signal processing circuit includes:

means responsive to said error signal to generate a frequency drift error signal indicative of a drift between the frequency for said fundamental Fourier component and the frequency of said alternating voltage;

means responsive to said frequency drift error signal to alter said phase angle signal for maintaining the frequency of said fundamental Fourier component in synchronism with the frequency of said alternating voltage.

37. A converter as defined in claim 36, wherein said feedback means includes:

first means for producing a signal representative of the voltage across said DC link terminals;

second means for producing a signal representative of said predetermined value;

third means coupled to said first and second means for processing said signal representative of the voltage across said DC link terminals and said signal representative of said predetermined value, and outputting said error signal.

38. A converter as defined in claim 37, wherein said signal processing circuit includes:

fourth means for generating a signal representative of a nominal frequency of said fundamental Fourier component;

fifth means coupled to said fourth means and to said third means, said fifth means processing the signal representative of a nominal frequency of said fundamental Fourier component and said error signal, and outputting said frequency drift error signal.

39. In a converter for interconnecting a first electric network and a second elecric network to transmit electric power from one network to the other, each of said networks being coupled to a respective active power source, said first network including DC link terminals for coupling said first network to said converter, said second network including AC link terminals for coupling said second network to said converter, there being an alternating voltage at a given frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage, a process for controlling the amount of real power flowing through said converter, said process comprising the step of:

varying said phase angle signal to bring the amount of real power flowing through said converter at a desired value.

40. A process as defined in claim 39, comprising the step of varying the signal representative of a desired phase angle between said fundamental Fourier component and said alternating voltage to keep the amount of real power flowing through said converter at a predetermined value.

41. A process as defined in claim 40, comprising the following steps:

generating an error signal representative of a difference between the amount of real power flowing through said converter and said predetermined value;

altering said phase angle signal in accordance with said error signal to obtain a bridge voltage waveform with a fundamental Fourier component at a phase angle with said alternating voltage corresponding to a real power flow through said converter at said predetermined value.

42. In a converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage, a process for controlling the amount of real power flowing through said converter, said process comprising the steps of:

varying said phase angle signal to bring the amount of real power flowing through said converter at a desired value;

varying the signal representative of a desired phase angle between said fundamental Fourier component and said alternating voltage to keep the amount of real power flowing through said converter at a predetermined value, the last mentioned signal varying step comprising:

generating an error signal representative of a difference between the amount of real power flowing through said converter and said predetermined value, and altering said phase angle signal in accordance with said error signal to obtain a bridge voltage waveform with a fundamental Fourier component at a phase angle with said alternating voltage corresponding to a real power flow through said converter at said predetermined value;

deriving from said error signal a frequency drift error signal representative of a drift between the frequency of said fundamental Fourier component and the frequency of said alternating voltage;

altering said phase angle signal in accordance with said frequency drift error signal for maintaining the frequency of said fundamental Fourier component in synchronism with the frequency of said alternating voltage.

43. A process as defined in claim 42, further comprising the steps of:

generating a signal representative of the amount of real power flowing through said converter;

generating a signal representative of said predetermined value;

adding the signal representative of the amount of real power flowing through said converter and the signal representative of said predetermined value to obtain the error signal representative of a difference between the amount of real power flowing through said converter and said predetermined value.

44. In a converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage, a process for controlling the voltage across said DC link terminals, said process comprising the step of:

varying said phase angle signal to bring the voltage across said DC link terminals to a desired value.

45. A process as defined in claim 44, comprising the step of varying said phase angle signal to keep the voltage across said DC link terminals at a predetermined value.

46. A process as defined in claim 45, comprising the following steps:

generating an error signal representative of a difference between the voltage across said DC link terminals and said predetermined value;

altering said phase angle signal in accordance with said error signal to obtain a bridge voltage waveform with a fundamental Fourier component at a phase angle with said alternating voltage corresponding to a voltage across said DC link terminals at said predetermined value.

47. In a converter for interconnecting a first electric network and a second electric network to transmit electric power from one network to the other, each of said networks being coupled to a respective active power source, said first network including DC link terminals for coupling said first network to said converter, said second network including AC link terminals for coupling said second network to said converter, there being an alternating voltage at a given frequency across said AC link terminals, said converter comprising:

a bridge of valves, each valve of said bridge being capable of assuming two different states, namely an ON state and an OFF state, in said ON state the valve allowing current to pass therethrough, in said OFF state the valve blocking the passage of current;

inductor means between said bridge and said AC link terminals;

valve control means coupled to said bridge to command the valves thereof to switch state to obtain a bridge voltage waveform with a fundamental Fourier component having a frequency corresponding substantially to the frequency of said alternating voltage, said valve control means including a phase angle input means for receiving a phase angle signal representative of a desired phase angle between said fundamental Fourier component and said alternating voltage, in response to said phase angle signal said valve control means outputting a valve state switching signal to obtain a bridge voltage waveform having a fundamental Fourier component at said desired phase angle with said alternating voltage, a process for controlling the voltage across said DC link terminals, said process comprising the step of:

varying said phase angle signal to bring the voltage across said DC link terminals to a desired value varying said phase angle signal to keep the voltage across said DC link terminals at a predetermined value, the latter signal varying step comprising the steps of (a) generating an error signal representative of a difference between the voltage across said DC link terminals and said predetermined value, and (b) altering said phase angle signal in accordance with said error signal to obtain a bridge voltage waveform with a fundamental Fourier component at a phase angle with said alternating voltage corresponding to a voltage across said DC link terminals at said predetermined value;

deriving from said error signal a frequency drift error signal representative of a drift between the frequency of said fundamental Fourier component and the frequency of said alternating voltage; and altering said phase angle signal in accordance with said frequency drift error signal for maintaining the frequency of said fundamental Fourier component in synchronism with the frequency of said alternating voltage.

48. A process as defined in claim 47, further comprising the steps of:

generating a signal representative of a voltage across said DC link terminals;

generating a signal representative of said predetermined value;

adding the signal representative of the voltage across said DC link terminals and the signal representative of said predetermined value to obtain the error signal representative of a difference between the voltage across said DC link terminals and said predetermined value.

49. In combination:
a positive DC bus;
a negative DC bus;
a first electric network coupled to an active power source, said first electric network including AC link terminals, there being an alternating voltage across said AC link terminals;
a second electric network coupled to an active power source, said second electric network including AC link terminals, there being an alternating voltage across the AC link terminals of the second electric network;
a first converter coupled to the AC link terminals of said first network, said first converter including DC link terminals coupled to said buses;
a second converter coupled to the AC link terminals of said second network, said second converter including DC link terminals coupled to said buses,
each converter including:
(a) a bridge of valves, each valve of said bridge being capable of assuming two different states, namely an ON state and an OFF state, in said ON state the valve allowing current to pass therethrough, in said OFF state the valve blocking the passage of current;
(b) inductor means between said bridge and the AC link terminals of the network coupled to the converter;
(c) valve control means coupled to said bridge for commanding the valves thereof to switch state to obtain a bridge voltage waveform having a fundamental Fourier component at a certain frequency and at a certain phase angle with the alternating voltage at the AC link terminals of the network coupled to the converter, said valve control means including a phase angle input means for receiving a signal representative of a desired phase angle between said fundamental Fourier component and the alternating voltage at the AC link terminals of the network coupled to the converter, in response to the signal received through said phase angle input means said valve control means generating a valve state switching signal to obtain a fundamental Fourier component at the desired phase angle with the alternating voltage at the AC link terminals of the network coupled to the converter, first signal processing circuit coupled to the phase angle input means of the valve control means of said first converter, said first signal processing circuit generating a signal to control the phase angle between the fundamental Fourier component of said first converter and the alternating voltage at the AC link terminals of said first network to maintain the voltage across the DC link terminals of said first converter generally constant; and second signal processing circuit coupled to the phase angle input means of the valve control means of said second converter, said second signal processing circuit generating a signal to control the phase angle between the fundamental Fourier component of the second converter and the alternating voltage at the AC link terminals of said second network to maintain the amount of real power flowing through said second converter at a predetermined level.

* * * * *